:::

(12) United States Patent
Kubota et al.

(10) Patent No.: US 8,312,513 B2
(45) Date of Patent: Nov. 13, 2012

(54) AUTHENTICATION SYSTEM AND TERMINAL AUTHENTICATION APPARATUS

(75) Inventors: Makoto Kubota, Kawasaki (JP); Kenichi Abiru, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 519 days.

(21) Appl. No.: 12/654,767

(22) Filed: Dec. 31, 2009

(65) Prior Publication Data

US 2010/0115587 A1 May 6, 2010

Related U.S. Application Data

(63) Continuation of application No. PCT/JP2007/063852, filed on Jul. 11, 2007.

(51) Int. Cl.
*H04L 29/06* (2006.01)

(52) U.S. Cl. .............. 726/3; 726/4; 726/5; 709/227; 709/228; 709/229

(58) Field of Classification Search .............. 726/3–5; 709/227–229
See application file for complete search history.

(56) References Cited

U.S. PATENT DOCUMENTS

2005/0055547 A1 3/2005 Kawamura

FOREIGN PATENT DOCUMENTS

| JP | 2002-016622 | 1/2002 |
|---|---|---|
| JP | 2002-232449 | 8/2002 |
| JP | 2004-207788 | 7/2004 |
| JP | 2004-228799 | 8/2004 |
| JP | 2005-085090 | 3/2005 |
| JP | 2005-286558 | 10/2005 |
| JP | 2006-171857 | 6/2006 |
| JP | 2006-324723 | 11/2006 |
| JP | 2007-174406 | 7/2007 |

OTHER PUBLICATIONS

International Search Report issued on Mar. 25, 2008 in corresponding PCT Application No. PCT/JP2007/063852.

*Primary Examiner* — Beemnet Dada
*Assistant Examiner* — Randal Moran
(74) *Attorney, Agent, or Firm* — Staas & Halsey LLP

(57) ABSTRACT

After checking a receiving message appearing on an output device, a network administrator inputs an authentication result to a setting terminal using an input device, such as a keyboard. Upon receiving the authentication result from the network administrator, the setting terminal registers, if the received authentication result is permission to access a network device, a MAC address of a traveling employee's terminal that is the sender of the authentication request in the network device as an access permitted terminal. After the registering in the network device is completed, the setting terminal sends the authentication result indicative of permission to access the network device to the employee's terminal, i.e., the sender of the authentication request.

17 Claims, 22 Drawing Sheets

FIG.4

BASIC FORMAT

| DESTINATION MAC ADDRESS |
| --- |
| SOURCE MAC ADDRESS |
| ETHERNET TYPE |
| HARDWARE TYPE |
| PROTOCOL TYPE |
| HARDWARE SIZE / PROTOCOL SIZE |
| OPERATION |
| SENDER ETHERNET ADDRESS |
| SENDER IP ADDRESS |
| TARGET ETHERNET ADDRESS |
| TARGET IP ADDRESS |

GRATUITOUS ARP REQUEST FORMAT

| FF-FF-FF-FF-FF-FF |
| --- |
| MAC-A |
| 0×0806 |
| 0×0001 |
| 0×0800 |
| 0×06 / 0×04 |
| 0×0001 |
| MAC-A |
| IP-B |
| 00-00-00-00-00-00 |
| IP-B |

GRATUITOUS ARP RESPONSE FORMAT

| MAC-A |
| --- |
| MAC-B |
| 0×0806 |
| 0×0001 |
| 0×0800 |
| 0×06 / 0×04 |
| 0×0002 |
| MAC-B |
| IP-B |
| MAC-A |
| IP-B |

FIG.10

BASIC FORMAT

| DESTINATION MAC ADDRESS |
| SOURCE MAC ADDRESS |
| ETHERNET TYPE |
| REQUEST/RESPONSE |
| DESTINATION IP |

AUTHENTICATION REQUEST FORMAT

| FF-FF-FF-FF-FF-FF |
| MAC-A |
| 0xxxxx (AUTHENTICATION) |
| 0x0001 (REQUEST) |
| IP-B |

AUTHENTICATION RESPONSE FORMAT

| MAC-A |
| MAC-B |
| 0xxxxx (AUTHENTICATION) |
| 0x0001 (RESPONSE) |
| NULL |

FIG.12

BASIC FORMAT
| DESTINATION MAC ADDRESS |
| SOURCE MAC ADDRESS |
| ETHERNET TYPE |
| REQUEST/RESPONSE |
| DESTINATION IP |
| USER ID |

AUTHENTICATION REQUEST FORMAT
| FF-FF-FF-FF-FF-FF |
| MAC-A |
| 0xxxxx (AUTHENTICATION) |
| 0 × 0001 (REQUEST) |
| IP-B |
| 0 × 0123 (EMPLOYEE NUMBER) |

AUTHENTICATION RESPONSE FORMAT
| MAC-A |
| MAC-B |
| 0xxxxx (AUTHENTICATION) |
| 0 × 0001 (RESPONSE) |
| NULL |
| NULL |

FIG.14

| BASIC FORMAT | AUTHENTICATION REQUEST FORMAT | AUTHENTICATION RESPONSE FORMAT |
|---|---|---|
| DESTINATION MAC ADDRESS | FF-FF-FF-FF-FF-FF | MAC-A |
| SOURCE MAC ADDRESS | MAC-A | MAC-B |
| ETHERNET TYPE | 0xxxxx (AUTHENTICATION) | 0xxxxx (AUTHENTICATION) |
| REQUEST/RESPONSE | 0 x 0001 (REQUEST) | 0 x 0001 (RESPONSE) |
| NUMBER OF DESTINATION IPs | 3 | NULL |
| FIRST DESTINATION IP1 | IP-B1 | NULL |
| SECOND DESTINATION IP2 | IP-B2 | NULL |
| THIRD DESTINATION IP3 | IP-B3 | NULL |

AUTHENTICATION SYSTEM AND TERMINAL AUTHENTICATION APPARATUS

CROSS-REFERENCE TO RELATED APPLICATION(S)

This application is a continuation of International Application No. PCT/JP2007/063852, filed on Jul. 11, 2007, the entire contents of which are incorporated herein by reference.

FIELD

The embodiments discussed herein are directed to an authentication system and a terminal authentication device.

BACKGROUND

Technologies have been used, in network access or processing corresponding to a request received via a network, that determine whether a user is authentic, give, if the user is authentic, permission to access the network, and perform required processing corresponding to the request received via the network (see, for example, Japanese Laid-open Patent Publication No. 2005-85090).

To improve usability of network access in an intra-corporate system, some technologies allow an employee to access a network at each company location.

For example, as illustrated in FIG. 22, with a conventional technology, a sub-network administrator at a given branch writes a MAC address of an employee from a different branch who comes to the given branch on a business trip (hereinafter, "traveling employee") to a MAC-address filter table stored in a switching hub (switch) or a list of MAC addresses stored in a dynamic host configuration protocol (DHCP) server using a setting terminal so that the travelling employee can access the network at the given branch. When the travelling employee goes back to his/her actual branch, the sub-network administrator deletes the MAC address of the traveling employee from the network device, such as the switch or the DHCP server, so that the temporary permission to access the network is cancelled.

There is a problem in that the above-described conventional technology increases the workload of the sub-network administrator leads to the sub-network administrator having a large workload. The sub-network administrator has to manually write/delete the MAC address of each traveling employee who comes to the branch to/from the network device, such as the switch or the DHCP server. Therefore, the workload of the administrator increases as the number of the traveling employees increases.

An increase of the number of the administrators can deal with the increase of the workload; however, this solution will not be practical because skilled persons are required for network configuration.

SUMMARY

According to an aspect of an embodiment of the invention, an authentication system includes a terminal device that is used to access a network device and a terminal authentication device that determines whether a user of the terminal device is authentic and can therefore access the network device. The terminal device and the terminal authentication device are connected to each other via a network. The terminal device includes a first input unit by which an IP address of the terminal authentication device is input; an authentication-request sending unit that sends an authentication request concerning whether access to the network device is permissible to the terminal authentication device using an authentication-request frame including a gratuitous ARP request in which the input IP address of the terminal authentication device is set as a sender IP address; an authentication-result receiving unit that receives a response frame from the terminal authentication device as an authentication result, the response frame responding to the authentication-request frame; an authentication-result output/display unit that outputs/displays a message indicating that the response frame is received when the response frame is received; and a network-access-information acquiring unit that acquires, from the network device, an IP address to access the network device, in response to an instruction to acquire the IP address from the first input unit. The terminal authentication device includes an authentication-request receiving unit that receives the authentication-request frame from the terminal device; an authentication-request output/display unit that outputs/displays a message indicating that the authentication-request frame is received when the authentication-request frame is received; a second input unit by which an authentication result indicating whether access to the network device is permissible is input; an information registering unit that registers, in the network device, if the input authentication result indicates permission to access the network device, a MAC address of the terminal device which is the sender of the authentication request as an access permitted terminal; and an authentication-result sending unit that sends the input authentication result to the terminal device which is the sender of the authentication request, after registering the MAC address in the network device is completed.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 4 is a schematic diagram of exemplary data structures of frame formats according to the first embodiment;

FIG. 10 is a schematic diagram of exemplary data structures of frame formats according to the second embodiment;

FIG. 12 is a schematic diagram of exemplary data structures of frame formats according to a fourth embodiment of the present invention

FIG. 14 is a schematic diagram of data structures of frame formats according to a fifth embodiment of the present invention

DESCRIPTION OF EMBODIMENTS

Preferred embodiments of the present invention will be explained with reference to accompanying drawings. In the following section, a first embodiment according to the present invention will be described, followed by some other embodiments according to the present invention.

[a] First Embodiment

In the description of the first embodiment, the outline and features of an authentication system according to the first embodiment, the configuration of the authentication system, and the processing performed by the authentication system are described in the order they appear in this sentence. After that, the effects of the first embodiment will be described.

Outline and Features of Authentication System

First Embodiment

Figure 1:
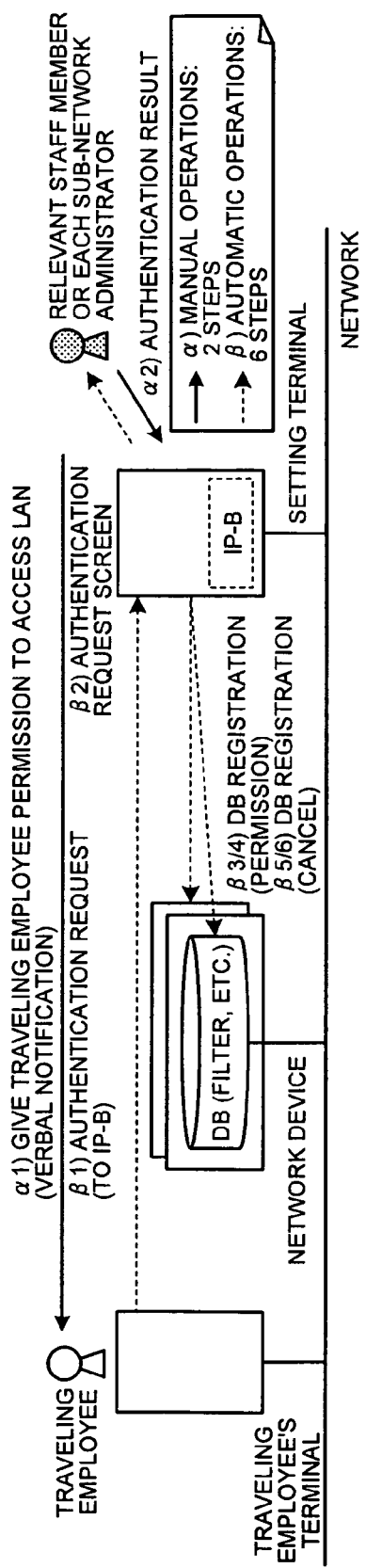
FIG. 1 is a schematic diagram illustrating the outline and features of an authentication system according to a first embodiment of the present invention.
Figure 2:
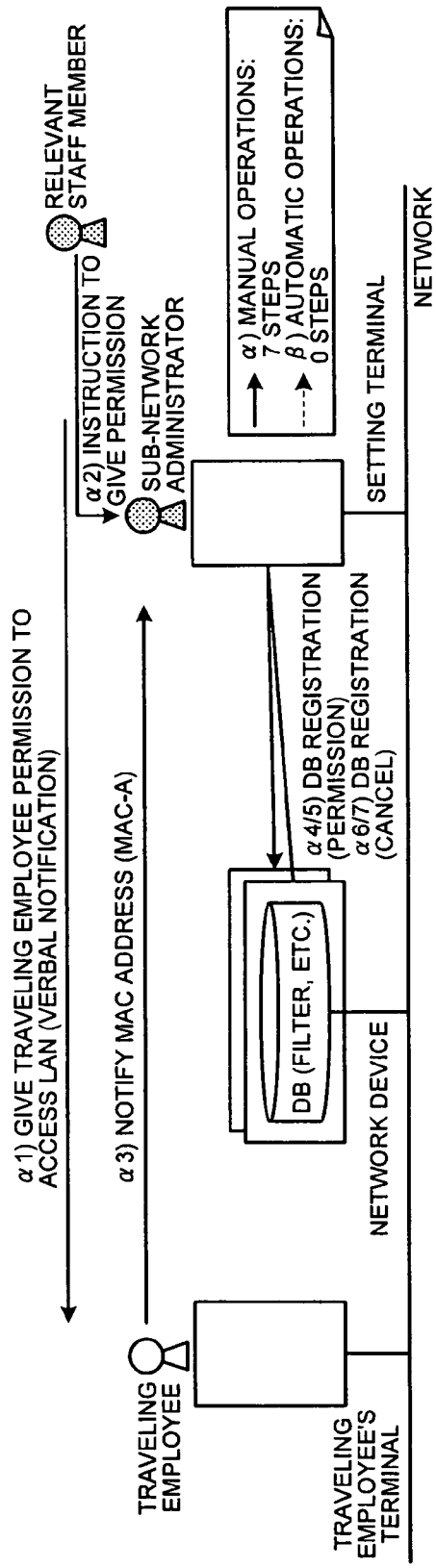
FIG. 2 is a schematic diagram illustrating the outline of processes that use a conventional technology.

First of all, the outline and features of the authentication system according to the first embodiment are described below with reference to FIGS. 1 and 2. FIG. 1 is a schematic diagram illustrating the outline and features of the authentication system according to the first embodiment. FIG. 2 is a schematic diagram illustrating the outline of processes that use a conventional technology.

In brief, the authentication system according to the first embodiment determines, when a user tries to access a network device using a terminal device, whether the user is authentic and can therefore access the network device. For example, the authentication system enables a relevant staff member (or a network administrator in charge of, for example, a sub-network) to allow a travelling employee to access a network, as if the traveling employee were in his/her own office, via a network. The main features of the authentication system according to the first embodiment are to facilitate authentication for temporary permission within the network and automatically perform the network device settings required when permission to access the network is given. With this configuration, the authentication system according to the first embodiment can reduce the workload of the network administrator.

The main features are described in details below. As illustrated in FIG. 1, the authentication system according to the first embodiment includes a travelling employee's terminal that the traveling employee uses to access the network device and a setting terminal that determines whether the user of the travelling employee's terminal, i.e., the traveling employee, is authentic and therefore can access the network device. The travelling employee's terminal and the setting terminal are connected to each other via a network.

The network administrator (or the relevant stuff member), who is the user of the setting terminal used in the authentication system according to the first embodiment, verbally gives the traveling employee information about the address of the setting terminal (IP-B) as authentication information in advance so that the travelling employee can access a LAN at the business trip destination.

The travelling employee's terminal sends an authentication request to the setting terminal using a frame including information about the address of the setting terminal, which is given by the network administrator in advance, as the authentication information for accessing the network device. The network device, herein, is a switching hub or a DHCP server within the network.

More particularly, the travelling employee opens an Internet protocol (IP) setting screen on the travelling employee's terminal and inputs "IP-B" using a keyboard. Upon receiving an input of "IP-B" from the traveling employee, the travelling employee's terminal sends, by the function of the operating system (OS), the authentication request to the setting terminal using a frame (gratuitous ARP frame) including the destination IP "IP-B". The gratuitous ARP frame is a frame that is sent, by a predetermined function of the OS, when an IP address is set on the terminal so as to check whether a terminal having an identical IP address is present within the network.

Upon receiving the authentication request from the travelling employee's terminal, the setting terminal displays a request receiving message indicating that the authentication request has been received on an output device (e.g., a display or a monitor). More particularly, if the destination IP address contained in the received frame is equal to "IP-B", which is verbally given to the user of the travelling employee's terminal as authentication information, the setting terminal determines the received frame to be the authentication request and displays the request receiving message on the output device. The request receiving message, for example, includes information, such as the authentication request, the source MAC address, and the receiving time, and it appears in such a manner that the network administrator understands the information at first glance. Any request receiving message can be used as long as it notifies the network administrator that the authentication request has been received.

After checking the request receiving message appearing on the output device, the network administrator inputs the result of authentication to the setting terminal using an input device, such as a keyboard. If the network administrator determines that the sender of the authentication request is the authentic user (traveling employee) by the timing when the authentication request has been received and the identical "IP-B", which is given as the authentication information, the network administrator inputs the authentication result indicative of permission to access the network device. If the network administrator determines that the sender of the authentication request is not the authentic user (traveling employee), the network administrator inputs the authentication result indicative of denial of access to the network device.

If it receives the authentication result indicative of permission to access the network device from the network administrator, the setting terminal registers the MAC address of the travelling employee's terminal, i.e., the sender of the authentication request, in the network device as an access permitted terminal.

After the registration in the network device is completed, the setting terminal sends the authentication result indicative of permission to access the network device to the travelling employee's terminal or the sender of the authentication request. If it receives the authentication result indicative of denial of access to the network device, the setting terminal sends the received authentication result to the travelling employee's terminal or the sender of the authentication request.

Upon receiving the authentication result from the setting terminal, the travelling employee's terminal displays a result receiving message indicating that the authentication result has been received on an output device (e.g., a display or a monitor). If the result receiving message appearing on the output device is checked and it is found that the user is permitted to access the network device, the traveling employee inputs an IP acquisition instruction to the travelling employee's terminal using the keyboard. The travelling employee's terminal sends an IP acquisition request to the network device (DHCP server) to acquire an IP that allows access to the network device and then receives the IP from the network device. The traveling employee then starts data communications using the received IP.

When it is required to cancel the permission for the traveling employee to access the network device, the network administrator inputs a cancel instruction to the setting terminal using the input device, such as the keyboard, so as to deny access by the traveling-employee's terminal to the network device. Upon receiving the cancel instruction from the network administrator, the setting terminal deletes information about the address of the target terminal device from a list of addresses of access permitted terminals stored in the network device.

It is clear from the above description that, with the authentication system according to the first embodiment, almost all the processes are automatically performed except for the input of the authentication result by the network administrator to the setting terminal. The conventional system illustrated in FIG. 2, which performs processes almost the same as those in the authentication system according to the first embodiment, has seven steps that require manual operation by the network administrator (or the relevant staff member) and no automatic steps. The authentication system according to the first embodiment illustrated in FIG. 1 has, in contrast, two steps that require manual operation by the network administrator (or the relevant staff member) and six automatic steps. That is, the number of steps that require manual operation by the network administrator (or the relevant staff member) is significantly reduced.

As has been mentioned above, the authentication system according to the first embodiment facilitates authentication for temporary permission to access a network and automatically performs network device settings required when permission to access the network device is given, which reduces the workload of the network administrator.

Configuration of Authentication System First Embodiment)

Figure 3:
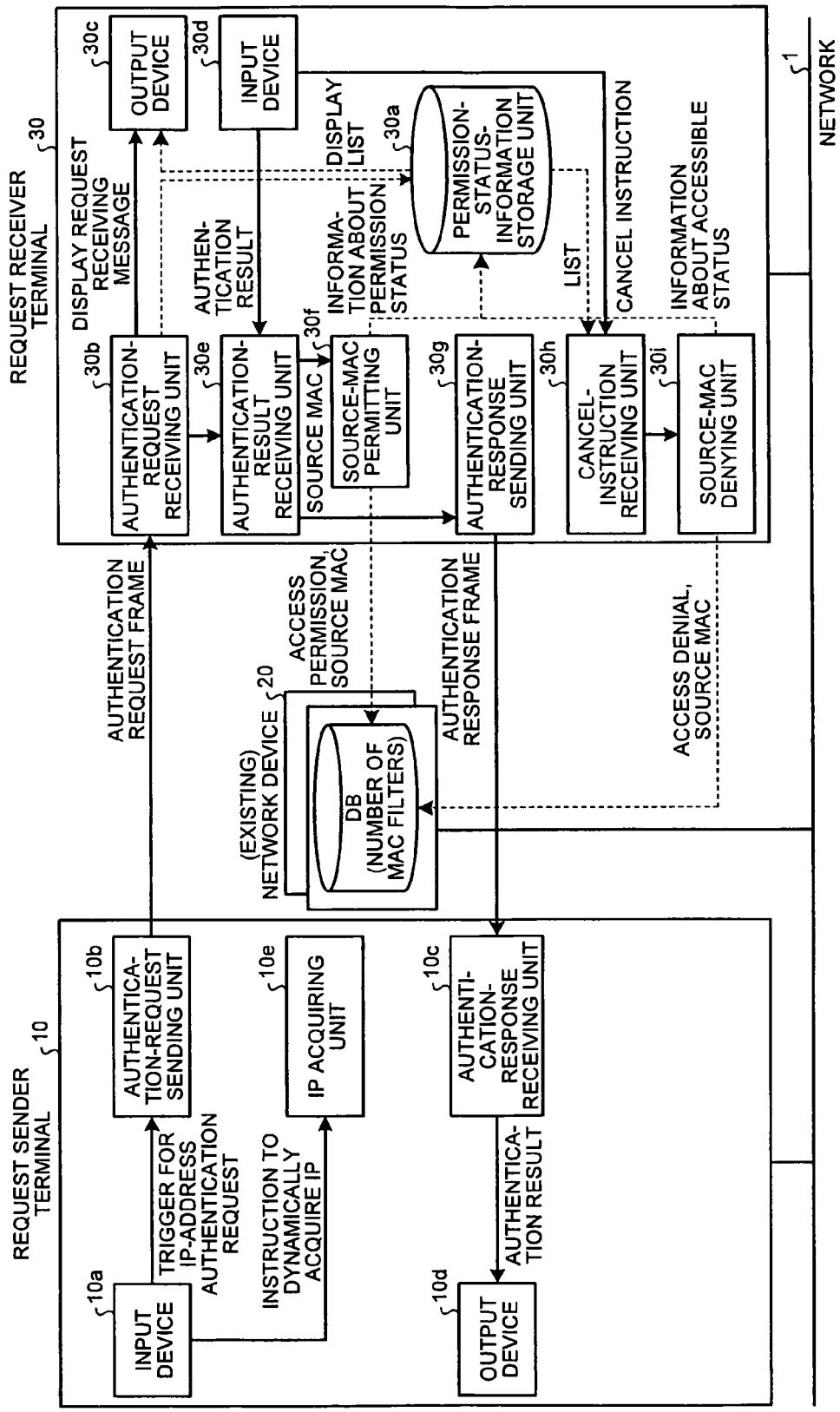
FIG. 3 is a block diagram of the configuration of the authentication system according to the first embodiment.

The authentication system according to the first embodiment is described below with reference to FIG. 3. FIG. 3 is a block diagram of the configuration of the authentication system according to the first embodiment. As illustrated in FIG. 3, the authentication system according to the first embodiment includes a request sender terminal 10 that is used to access the network device and a request receiver terminal 30 that determines whether the user of the request sender terminal is authentic and can therefore access a network device 20. Both terminals are connected to each other via a network 1.

The request sender terminal 10 includes an input device 10a, an authentication-request sending unit 10b, an authentication-response receiving unit 10c, an output device 10d, and an IP acquiring unit 10e. The authentication-response receiving unit 10c may be referred to as the "authentication-result receiving unit". The output device 10d may be referred to as the "authentication-result output/display unit". The IP acquiring unit 10e may be referred to as the "network-access-information acquiring unit".

The input device 10a receives various setting inputs, such as an input of information about the address of the request receiver terminal 30 (e.g., "IP-B") as the authentication information, from the user who opens the IP setting screen. The input device 10a is, for example, a keyboard or a mouse.

Upon receiving a setting input of information about the address of the request receiver terminal 30 (e.g., "IP-B") as the authentication information via the input device 10a, the authentication-request sending unit 10b sends, by the function of the OS, an authentication request to the request receiver terminal 30 using a frame (gratuitous ARP frame) including the destination IP "IP-B".

The gratuitous ARP frame is a frame that is sent, by a predetermined function of the OS, when an IP address is set on the terminal so as to check whether a terminal having an identical IP address is present within the network.

FIG. 4 illustrates examples of data structures of frames that are used for communications between the request sender terminal 10 and the request receiver terminal 30, where the examples includes a basic format, a request format that is sent from the request sender terminal 10 to the request receiver terminal 30, and a response format that is sent from the request receiver terminal 30 to the request sender terminal 10. FIG. 4 is a schematic diagram of the exemplary data structures of the frame formats according to the first embodiment. If a value contained in a field "Sender IP Address" is equal to a value contained in a field "Target IP Address" as illustrated in FIG. 4, the frame is determined to be a "gratuitous APR frame". A value of "Ethernet (trademark) Type" is set to a fixed value indicative of an existing ARP (e.g., 0x0806). The switches within the network are set to allow a frame to pass through that includes the value of the field of "Ethernet (trademark) Type".

The authentication-response receiving unit 10c receives an authentication result from the request receiver terminal 30 as a response to the authentication request and causes the output device 10d to output a result receiving message indicating that the authentication result has been received.

The output device 10d displays thereon the result receiving message. The output device is, for example, a display or a monitor that displays the result receiving message or a printer that prints out the result receiving message.

Upon receiving an IP acquisition instruction from the user via the input device 10a, the IP acquiring unit 10e sends an IP acquisition request to the network device 20 (e.g., DHCP server) to acquire an IP address that allows access to the network device 20 and then receives the IP address from the network device 20.

The network device 20 is, for example, a switching hub or a DHCP server within the network 1.

The request receiver terminal 30 includes an permission-status-information storage unit 30*a*, an authentication-request receiving unit 30*b*, an output device 30*c*, an input device 30*d*, an authentication-result receiving unit 30*e*, a source-MAC permitting unit 30*f*, an authentication-response sending unit 30*g*, a cancel-instruction receiving unit 30*h*, and a source-MAC denying unit 30*i*.

The permission-status-information storage unit 30*a* may be referred to as the "access-permission-status storage unit". The output device 30*c* may be referred to as the "authentication-request output/display unit". The source-MAC permitting unit 30*f* may be referred to as the "information registering unit". The authentication-response sending unit 30*g* may be referred to as the "authentication-result sending unit". The source-MAC denying unit 30*i* may be referred to as the "access-permission canceling unit".

Upon receiving the authentication request, the permission-status-information storage unit 30*a* stores therein both information about the address (e.g., source MAC address) of the request sender terminal 10, i.e., the sender of the authentication request, and information about access permission status indicating whether the request sender terminal 10 is permitted to access the network device 20 in an associated manner.

The source MAC address is a value indicative of the sender's MAC address and is contained in the field "Source MAC Address" or "Sender Ethernet Address". The information about the access permission status includes, for example, receiving time of the authentication request and permission status as to whether access by the request sender terminal 10 is permitted (e.g., "under authentication", "authentic and permitted", "permission denied", etc). The permission status is updatable by each processing unit.

The authentication-request receiving unit 30*b* receives the authentication request from the request sender terminal 10 and causes the output device 30*c* to output a request receiving message indicating that the authentication request has been received. More particularly, if the destination IP address that is contained in the received frame is the same as the address of the request receiver terminal 30 (e.g., "IP-B"), which is verbally given to the user of the request sender terminal 10 as the authentication information, the authentication-request receiving unit 30*b* determines the received frame to be the authentication request and displays the request receiving message on the output device 30*c*. The authentication-request receiving unit 30*b* then stores in the permission-status-information storage unit 30*a* the permission status "under authentication" associated with the MAC address of the request sender terminal 10, i.e., the sender of the authentication request.

The output device 30*c* displays thereon the request receiving message. The output device is, for example, a display or a monitor that displays the request receiving message or a printer that prints out the request receiving message. The request receiving message, for example, includes information, such as the authentication request, the source MAC address, and the receiving time, and it appears in such a manner that the network administrator understands the information at first glance. Any request receiving message can be used as long as it notifies the network administrator that the authentication request has been received.

The input device 30*d* receives various inputs from the user when, for example, the user checks the request receiving message appearing on the output device 30*c* and then inputs an authentication result.

The authentication-result receiving unit 30*e* receives, from the user via the input device 30*d*, an authentication result indicating that the request sender terminal 10 is permitted to access the network device 20 or an authentication result indicative of denial of access to the network device 20. If the authentication result indicative of permission to access the network device 20 is received, the authentication-result receiving unit 30*e* instructs the source-MAC permitting unit 30*f* to register the MAC address of the request sender terminal 10, i.e., the sender of the authentication request in the network device 20, as an access permitted terminal.

The source-MAC permitting unit 30*f* receives the instruction from the authentication-result receiving unit 30*e* and registers the MAC address of the request sender terminal 10, i.e., the sender of the authentication request in the network device 20, as an access permitted terminal. The source-MAC permitting unit 30*f* updates the permission status of the MAC address of the request sender terminal 10, i.e., the sender of the authentication request that is present in the permission-status-information storage unit 30*a* (e.g., updates from "under authentication" to "authentic and permitted").

After the registration by the source-MAC permitting unit 30*f* in the network device 20 is completed, the authentication-response sending unit 30*g* sends the authentication result received by the authentication-result receiving unit 30*e*, i.e., the authentication result indicating that the request sender terminal 10 is permitted to access the network device 20, to the request sender terminal 10 using the same frame as that received from the request sender terminal 10. The MAC address of the request sender terminal 10 is received from the authentication-request receiving unit 30*b* via the authentication-result receiving unit 30*e*. Conversely, if the authentication result indicative of denial of access to the network device 20 is received, the authentication-response sending unit 30*g* sends the authentication result indicative of access denial to the request sender terminal 10, i.e., the sender of the authentication request. Alternatively, it is allowable to configure the authentication-response sending unit 30*g* to send no response when an authentication result is received that is indicative of denial of access to the network device 20.

The cancel-instruction receiving unit 30*h* receives an input of a cancel instruction from the user via the input device 30*d* to cancel the permission for the request sender terminal 10 to access the network device 20. The cancel-instruction receiving unit 30*h* then instructs the source-MAC denying unit 30*i* to cancel the permission.

The source-MAC denying unit 30*i* receives the cancel instruction from the cancel-instruction receiving unit 30*h* and deletes the MAC address of the request sender terminal 10, which is the target address specified by the received cancel instruction, from the list of addresses of access permitted terminals that is stored in the network device 20. The source-MAC denying unit 30*i* updates the permission status of the MAC address of the request sender terminal 10, which is the target address specified by the received cancel instruction, that is present in the permission-status-information storage unit 30*a* (e.g., updates from "authentic and permitted" to "permission denied").

The request receiver terminal 30 is equipped with a setting input unit supporting a certain setting interface that is used to register the IP address of the network device 20 and the MAC addresses of some other devices in the network device 20 and has input information in advance.

The request sender terminal 10 and the request receiver terminal 30 can be implemented by adding the above-described functions to well-known information processing devices, such as personal computers or workstations.

Processing Performed by Authentication System (First Embodiment)

Figure 5:
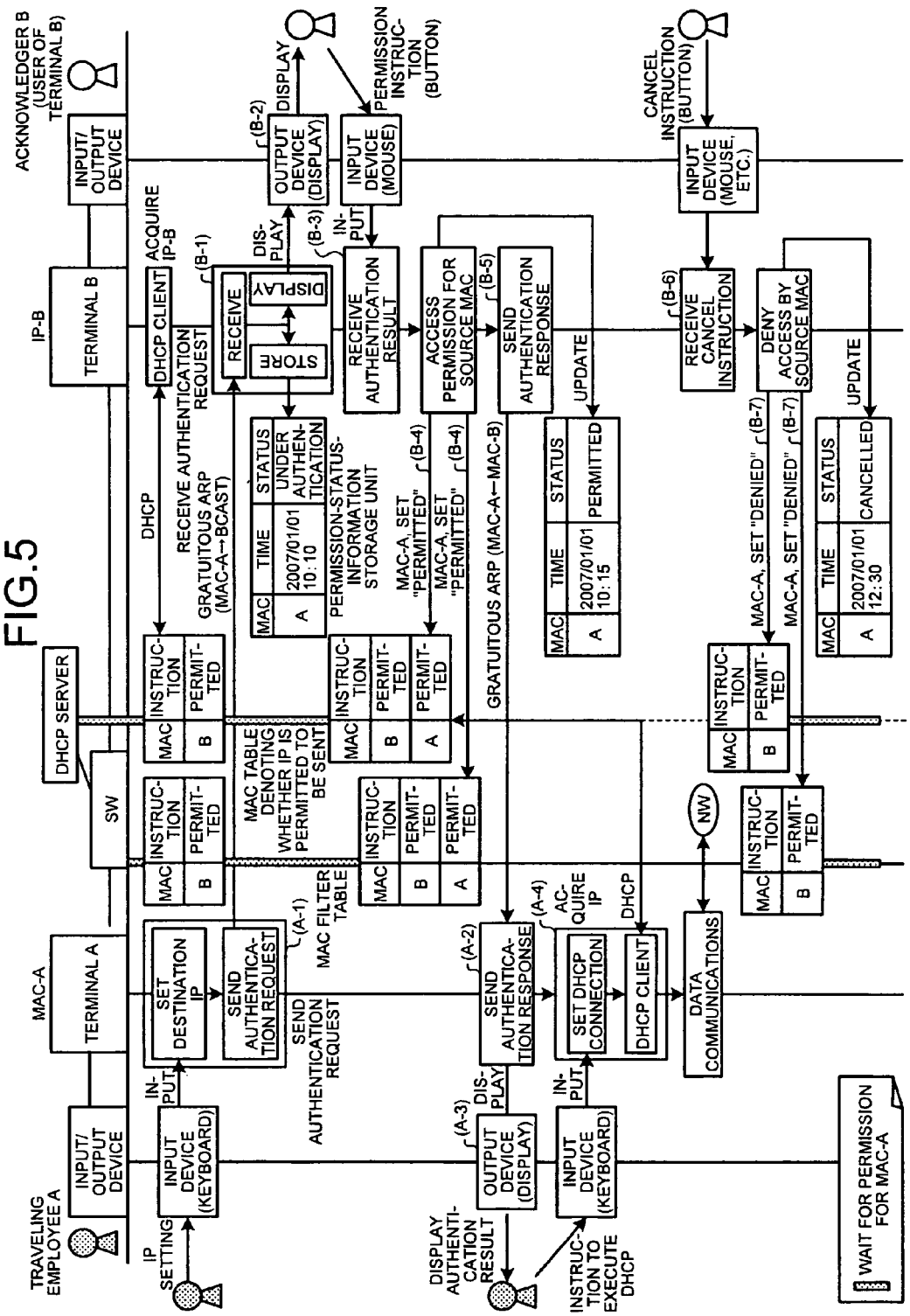
FIG. 5 is a sequence diagram of processes performed by the authentication system according to the first embodiment.
Figure 6:
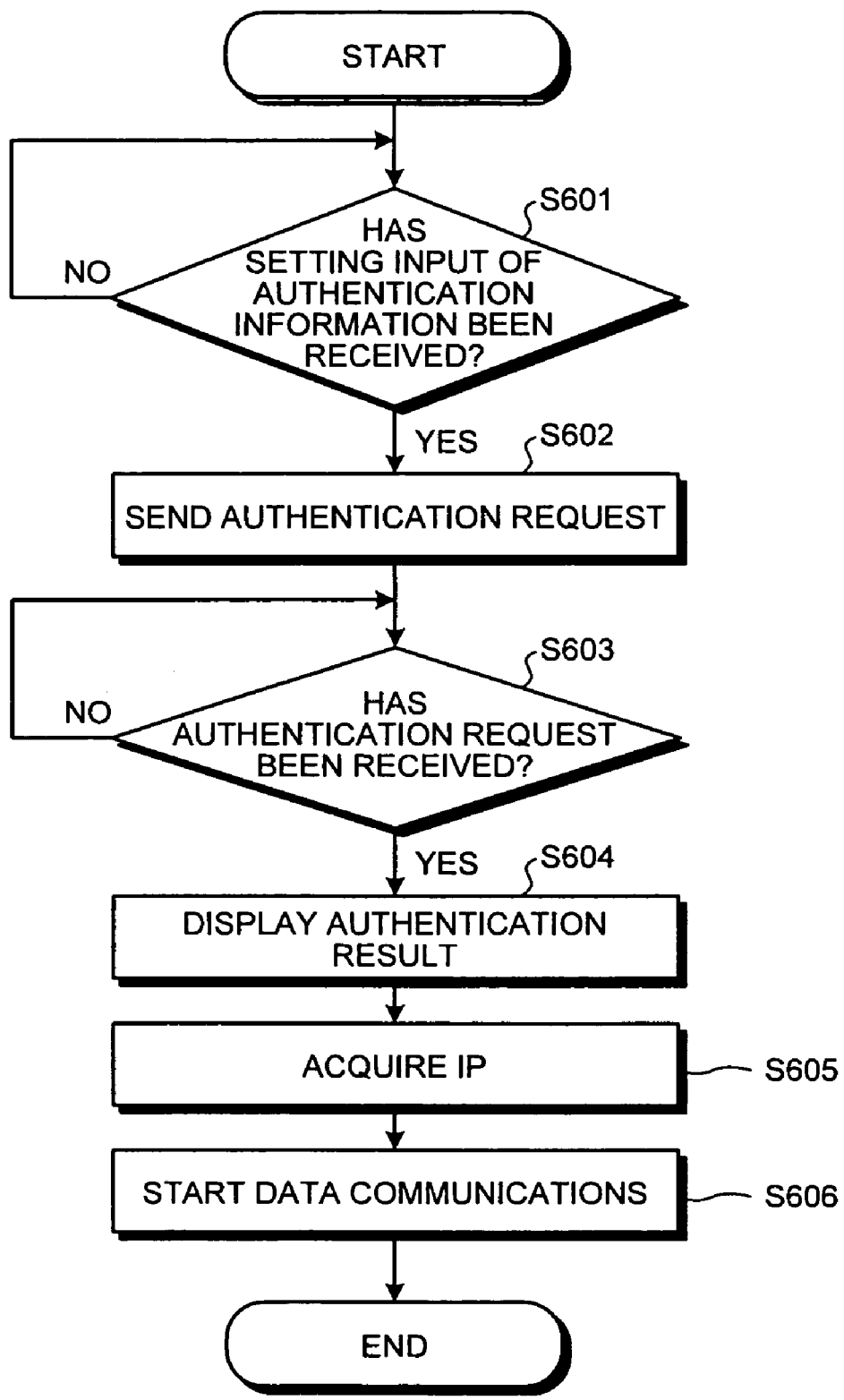
FIG. 6 is a flowchart of processes performed by a request sender terminal according to the first embodiment.
Figure 7:
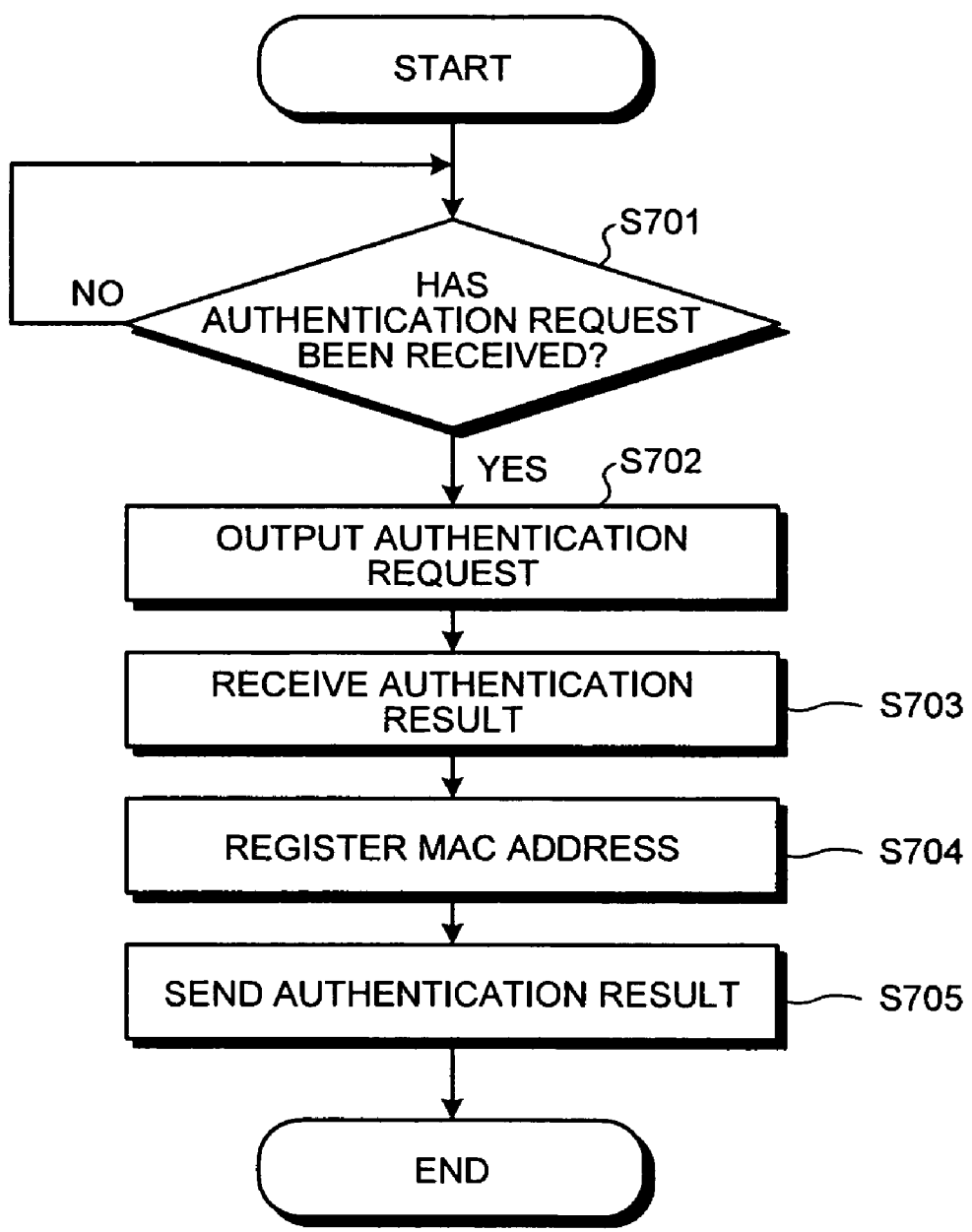
FIG. 7 is a flowchart of an access-permission registering process performed by a request receiver terminal according to the first embodiment.
Figure 8:
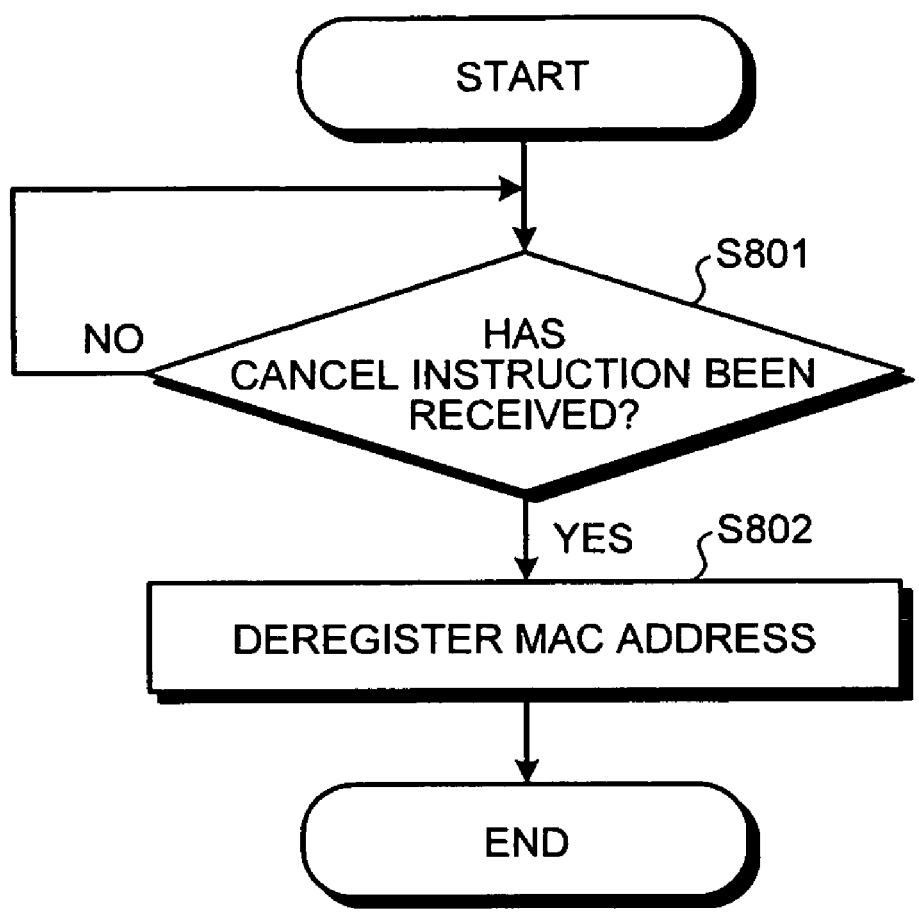
FIG. 8 is a flowchart of an access-permission cancelling process performed by the request receiver terminal according to the first embodiment.

Processing performed by the authentication system according to the first embodiment is described below with reference to FIGS. 5 to 8. FIG. 5 is a sequence diagram of the processes performed by the authentication system according to the first embodiment. FIG. 6 is a flowchart of processes performed by the request sender terminal according to the first embodiment. FIG. 7 is a flowchart of an access-permission registering process performed by the request receiver terminal according to the first embodiment. FIG. 8 is a flowchart of an access-permission cancelling process performed by the request receiver terminal according to the first embodiment.

Processing Performed by Request Sender Terminal

The processing performed by the request sender terminal according to the first embodiment is described with reference to FIGS. 5 and 6. As illustrated in FIG. 6, upon receiving, via the input device 10a, an authentication-request sending instruction, i.e., a setting input of information about the address of the request receiver terminal 30 (e.g., "IP-B") as the authentication information (Yes at Step S601), the authentication-request sending unit 10b sends, by the function of the OS, an authentication request to the request receiver terminal 30 using a frame (gratuitous ARP frame) that includes the destination IP "IP-B" (Step S602, see A-1 of FIG. 5).

Upon receiving an authentication result as a response to the authentication request from the request receiver terminal 30 (Yes at Step S603, see A-2 of FIG. 5), the authentication-response receiving unit 10c causes the output device 10d to output a result receiving message indicating that the authentication result has been received (Step S604, see A-3 of FIG. 5).

After that, upon receiving an IP acquisition instruction via the input device 10a, the IP acquiring unit 10e sends an IP acquisition request to the network device 20 (e.g., DHCP server) to acquire an IP that allows access to the network device 20 by using the DHCP client function and then receives the IP from the network device 20 (Step S605, see A-4 of FIG. 5). The request sender terminal 10 starts data communications using the received IP (Step S606).

Access-Permission Registering Process Performed by Request Receiving Terminal (First Embodiment)

The access-permission registering process performed by the request receiver terminal according to the first embodiment is described below with reference to FIGS. 5 and 7. As illustrated in FIG. 7, upon receiving the authentication request from the request sender terminal 10 (Yes at Step S701, see B-1 of FIG. 5), the authentication-request receiving unit 30b causes the output device 30c to output a request receiving message indicating that the authentication request has been received (Step S702, see B-2 of FIG. 5).

After that, the authentication-result receiving unit 30e receives an input of either an authentication result indicating that the request sender terminal 10 is permitted to access the network device 20 or an authentication result indicative of denial of access to the network device 20 from the user via the input device 30d (Yes at Step S703, see B-3 of FIG. 5). If the authentication result indicative of permission to access the network device is received, the authentication-result receiving unit 30e instructs the source-MAC permitting unit 30f to register the MAC address of the request sender terminal 10, which is the sender of the authentication request, in the network device 20 as an access permitted terminal.

The source-MAC permitting unit 30f receives the instruction from the authentication-result receiving unit 30e and registers the MAC address of the request sender terminal 10, which is the sender of the authentication request, in the network device 20 as an access permitted terminal (Step S704, see B-4 of FIG. 5).

After the registration by the source-MAC permitting unit 30f in the network device 20 is completed, the authentication-response sending unit 30g sends the authentication result received by the authentication-result receiving unit 30e, i.e., the authentication result indicative of permission to access the network device 20, to the request sender terminal 10 (Step S705, see B-5 of FIG. 5).

Access-Permission Canceling Process Performed by Request Receiving Terminal (First Embodiment)

The access-permission canceling process performed by the request receiver terminal according to the first embodiment is described below with reference to FIGS. 5 and 8. As illustrated in FIG. 8, upon receiving an input of a cancel instruction from the user via the input device 30d to cancel the permission for the request sender terminal 10 to access the network device 20 (Yes at Step S801, see B-6 of FIG. 5), the cancel-instruction receiving unit 30h instructs the source-MAC denying unit 30i to cancel the permission.

The source-MAC denying unit 30i receives the cancel instruction from the cancel-instruction receiving unit 30h and then deletes the MAC address of the request sender terminal 10, which is the target address specified by the received cancel instruction, from a list of address data of terminal devices able to access the network device 20 (Step S802, see B-7 of FIG. 5).

Advantage of First Embodiment

As mentioned above, in the authentication system according to the first embodiment that includes a terminal device (the request sender terminal 10) that is used to access a network device and a terminal authentication device (the request receiver terminal 30) that determines whether the terminal device is authentic and can therefore access the network device 20, where both the terminal device and the terminal authentication device are connected to each other via a network, the terminal device sends an authentication request to the terminal authentication device to access the network device, receives an authentication result from the terminal authentication device as a response to the authentication request, outputs/displays the received authentication result, and acquires network access information that allows access to the network device from the network device depending on the received authentication result, while the terminal authentication device receives the authentication request from the terminal device, outputs/displays the received authentication request, receives the authentication result indicating whether access to the network device is permissible, registers, if the authentication result indicative of permission to access the network device is received, information about the address of the terminal device, which is the sender of the authentication request, in the network device as an access permitted terminal, and sends, after the registration in the network device is completed, the authentication result to the terminal device, which is the sender of the authentication request. With this configuration, easy authentication for temporary permission to access the network is implemented and the network device settings required when permission to access the network device is given are automatically performed, which significantly reduces the workload of the network administrator.

Moreover, upon receiving the authentication request, the request receiver terminal 30 in the first embodiment stores therein information about the address (e.g., the MAC address) of the request sender terminal 10, which is the sender of the authentication request, and information about the access permission status (including, for example, the receiving time of the authentication request and the permission status) in an associated manner. Therefore, the administrator of the request receiver terminal 30 can check the permission status of the request sender terminal 10 if required.

Furthermore, to send/receive the authentication request to the authentication result to/from the request sender terminal 10 or the request receiver terminal 30 in the first embodiment, existing frames (e.g., gratuitous ARP frames), which have already been implemented by each device, are used. Therefore, the sending/receiving of the authentication request or the authentication result is implemented using the existing function without adding a new function or the like to the devices.

Although the authentication-response sending unit 30g in the above-described first embodiment sends the authentication result, which is received by the authentication-result receiving unit 30e, to the request sender terminal 10 after the registration in the network device 20 is completed, the present invention is not limited thereto. It is allowable to send the authentication result before the completion of the registration at a predetermined timing that is determined taking the time required for the registration into consideration.

Although the IP acquiring unit 10e in the above-described first embodiment sends, by the DHCP client function or the like, an IP acquisition request to the network device 20 and receives an IP address that allows access to the network device 20 from the network device 20, the present invention is not limited thereto. Alternatively, for example, the request receiver terminal 30 sends the authentication result in the form of a frame including the IP address allocated to the request sender terminal 10. The request sender terminal 10 then uses the IP address included in the received frame.

Although the request receiver terminal 30 in the above-described first embodiment performs the MAC settings on the network device 20, the present invention is not limited thereto. Alternatively, for example, the source-MAC permitting unit 30f and the source-MAC denying unit 30i send an instruction for an MAC to be permitted/denied to the network device 20. Upon receiving the instruction, the existing network management device actually performs the settings. In this case, because the request receiver terminal 30 inputs commands supported only by the API of the network management device instead of various commands each supported by the corresponding API, the request receiver terminal 30 can be implemented more easily.

[b] Second Embodiment

Figure 9:
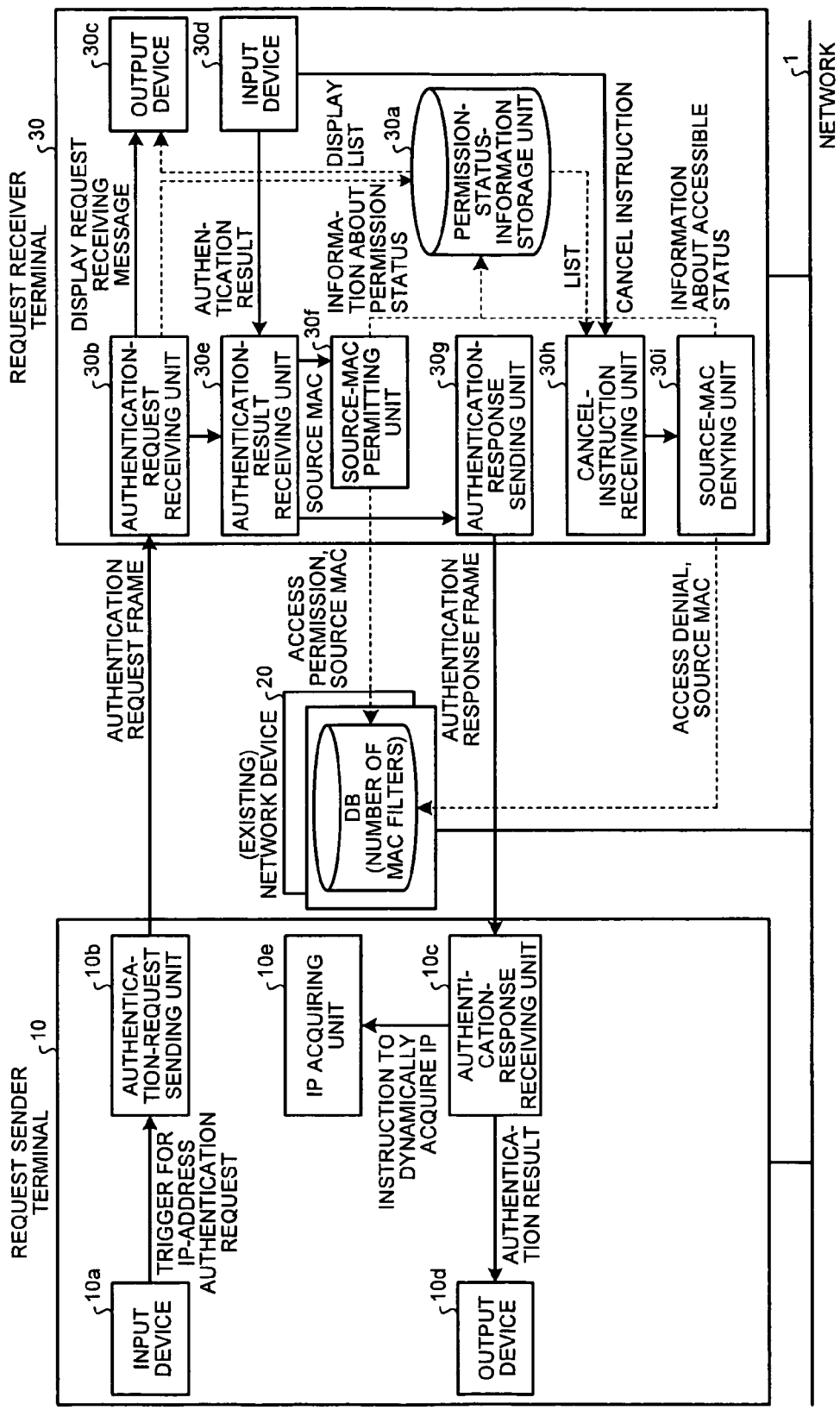
FIG. 9 is a block diagram of the configuration of an authentication system according to a second embodiment of the present invention.

The example has been mentioned in the above first embodiment in which the authentication request or the authentication result is sent/received using a frame (gratuitous ARP frame) that is supported by the function of the OS. However, the present invention is not limited thereto. It is allowable to send/receive the authentication request or the authentication result using a predetermined dedicated frame. An authentication system according to a second embodiment of the present invention is described below with reference to FIGS. 9 and 10. FIG. 9 is a block diagram of the configuration of the authentication system according to the second embodiment. FIG. 10 is a schematic diagram of exemplary data structures of frame formats according to the second embodiment.

As illustrated in FIG. 9, the authentication system according to the second embodiment has basically the same configuration as the authentication system according to the first embodiment except for the following points.

The authentication-request sending unit 10b of the request sender terminal 10 sends an authentication request to the request receiver terminal 30 using a frame dedicated to the authentication. The format of the dedicated frame include various fields, such as "Ethernet (trademark) Type", "Destination IP address", and "Request/Response Type" as illustrated in FIG. 10. A predetermined value is store in the field of "Ethernet (trademark) Type". The switches are set to allow a frame to pass through that includes the predetermined value of the field of "Ethernet (trademark) Type". If an authentication request is sent from the request sender terminal 10, a value representing "Request" is stored in the field of "Request/Response Type". If an authentication result is sent from the request receiver terminal 30, a value representing "Response" is stored in the field of "Request/Response Type".

Upon receiving the authentication result from the request receiver terminal 30 using the dedicated frame, the authentication-response receiving unit 10c of the request sender terminal 10 checks contents of the received authentication result. If it is determined, as a result of the check, that the authentication result is permission to access the network device 20, the authentication-response receiving unit 10c instructs the IP acquiring unit 10e to acquire the IP address. Upon receiving the instruction from the authentication-response receiving unit 10c, the IP acquiring unit 10e sends an IP acquisition request to the network device 20 (e.g., DHCP server) to acquire the IP address that allows access to the network device 20 and then receives the IP address from the network device 20.

The other processes performed by the request sender terminal 10 are the same as those of the above-described first embodiment.

If the frame received from the request sender terminal 10 includes the destination IP address the same as the address of the request receiver terminal 30 (e.g., "IP-B"), information of which has been verbally given to the user of the request sender terminal 10, and the value in the field of "Ethernet (trademark) Type" indicating that the frame is dedicated to the authentication, the authentication-request receiving unit 30b of the request receiver terminal 30 determines the received frame to be the authentication request and displays a request receiving message on the output device 30c.

The other processes performed by the request receiver terminal 30 are the same as those of the above-described first embodiment.

As mentioned above, because the request sender terminal 10 and the request receiver terminal 30 in the second embodiment send/receive an authentication request or an authentication result using a frame dedicated to the authentication, the sending/receiving of an authentication request or an authentication result is implemented using the dedicated frame different from existing frames, so that the existing frames, which have been implemented by each device, can be used for their original purposes.

The above-described data structure in the second embodiment is an example. Any format can be used as long as the format includes, at least, "Ethernet (trademark) Type", "Source IP address", and "Request/Response Type".

[c] Third Embodiment

Figure 11:
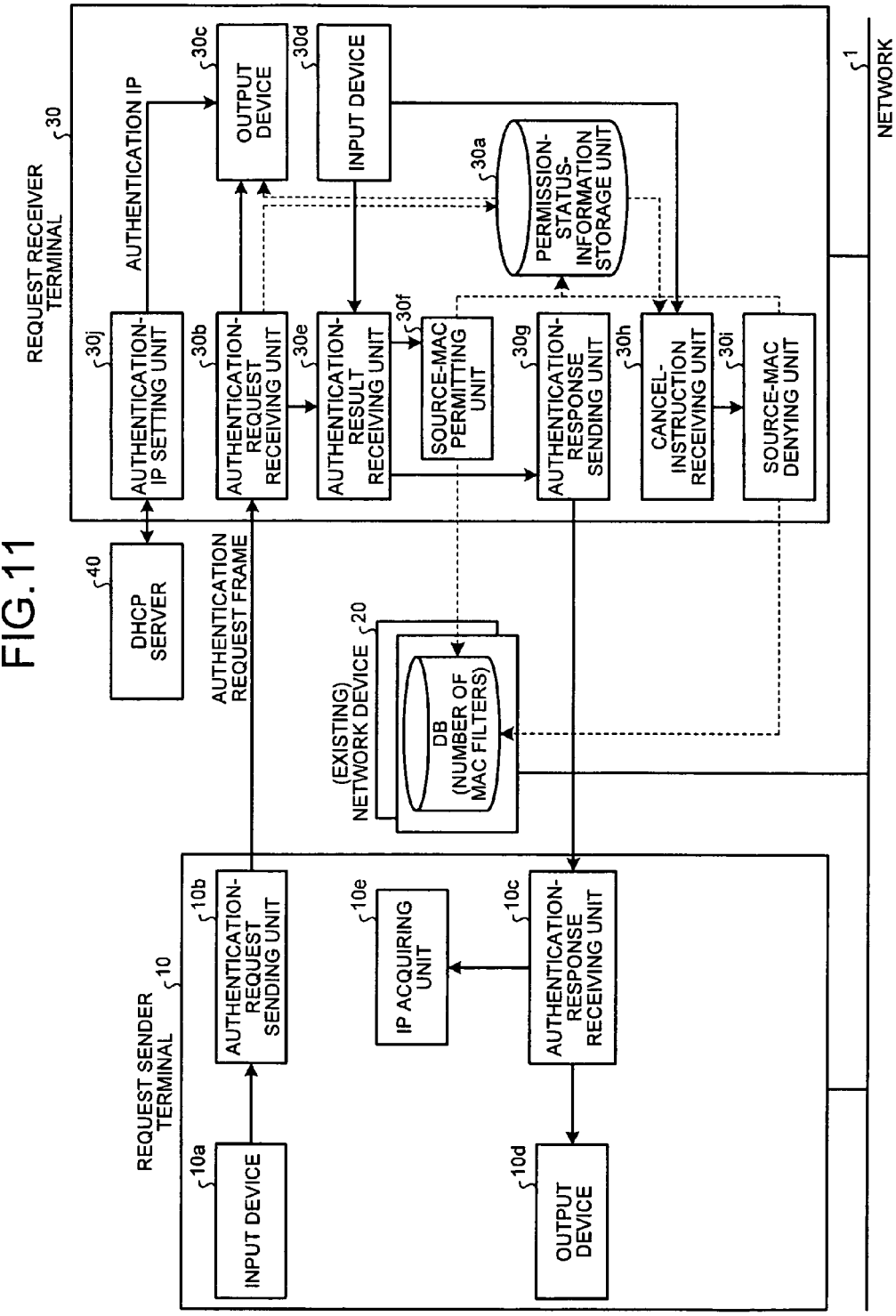
FIG. 11 is a block diagram of the configuration of an authentication system according to a third embodiment of the present invention.

Although it has been mentioned in the above embodiments that the address of the request receiver terminal 30 (e.g., IP address "IP-B") is used as the authentication information, some other types of information, such as information about an address dedicated to the authentication, can be used instead of the IP address. The configuration of an authentication system according to a third embodiment of the present invention is described below with reference to FIG. 11. FIG. 11 is a block diagram of the configuration of the authentication system according to the third embodiment.

As illustrated in FIG. 11, the authentication system according to the third embodiment has basically the same configuration as those of the above embodiments except that the request receiver terminal 30 further includes an authentication-IP setting unit 30j.

The authentication-IP setting unit 30j has a virtual authentication MAC address different from the MAC address used for communications in the normal situations. The authentication-IP setting unit 30j requests a DHCP server 40 for an IP address corresponding to the virtual MAC address and then receives the IP address from the DHCP server 40. The user of the request receiver terminal 30 notifies the user of the request sender terminal 10 of the information about the address acquired in the above manner so that the information about the address can be used as the authentication information.

The authentication-IP setting unit 30j can be designed to have a user interface using which a user manually sets an IP different from the IP that is used for communications in the normal situations.

As mentioned above, the request receiver terminal 30 in the third embodiment acquires an authentication address different from the address that has been allocated thereto, which prevents a leak of information about the address that is used for communications in the normal situations via the network.

[d] Fourth Embodiment

In the second embodiment, it is allowable to design, as illustrated in FIG. 12, the dedicated frame to have a field to store therein information for identifying the sender of the authentication request (user ID) and send the authentication request using the dedicated format including the user ID of the sender. FIG. 12 is a schematic diagram of exemplary data structures of frame formats according to a fourth embodiment of the present invention.

The outline of an authentication system according to the fourth embodiment is described below. When, for example, the user inserts an employee card to the request sender terminal 10, the request sender terminal 10 receives a setting input of information about the address of the request receiver terminal 30 (e.g., "IP-B") as the authentication information via the input device 10a. The authentication-request sending unit 10b then reads the employee number from the inserted employee card, stores the employee number in the field "user ID" of the dedicated frame, and sends the authentication request to the request receiver terminal 30.

If the frame received from the request sender terminal 10 includes the destination IP address the same as the address of the request receiver terminal 30 (e.g., "IP-B"), information of which has been verbally given to the user of the request sender terminal 10, and the value in the field of "Ethernet (trademark) Type" indicating that the frame is dedicated to the authentication, the authentication-request receiving unit 30b of the request receiver terminal 30 determines the received frame to be the authentication request and displays a request receiving message on the output device 30c. The employee number that is stored in the field "user ID" of the frame appears on the request receiving message so that the user of the request receiver terminal 30 performs the authentication using the employee number.

The other processes performed by the request sender terminal 10 and the request receiver terminal 30 are the same as those in the above embodiments.

As mentioned above, the request sender terminal 10 sends the authentication request using the frame including the user ID (e.g., employee number) for identifying the user of the request sender terminal 10 so that the request receiver terminal 30 performs the authentication using the user identifier in addition to the authentication information, which allows more accurate authentication.

[e] Fifth Embodiment

If the authentication system according to the second embodiment includes a plurality of request receiver terminals 30 that determine whether the user of the request sender terminal 10 is authentic and can therefore access the network device 20, it is allowable to design the dedicated frame to have a plurality of fields of destinations (e.g., "First Destination IP", "Second Destination IP", and "Third Destination IP") as illustrated in FIG. 14 so as to send the authentication request to the plural request receiver terminals 30. FIG. 14 is a schematic diagram of data structures of frame formats according to a fifth embodiment of the present invention.

Figure 13:
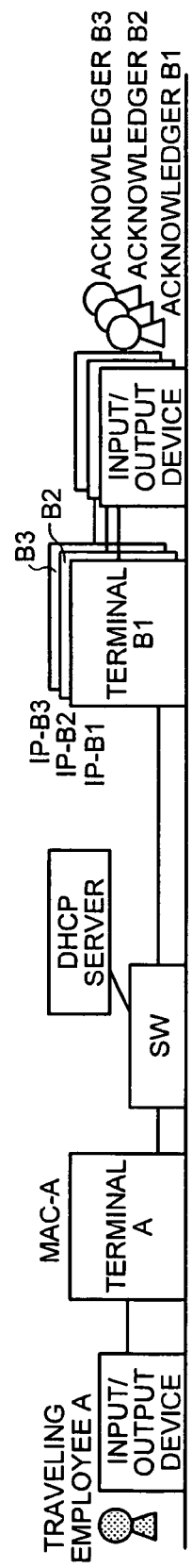
FIG. 13 is a schematic diagram of the outline of an authentication system according to a fifth embodiment of the present invention.

The outline of an authentication system according to the fifth embodiment is described in brief with reference to FIG. 13. FIG. 13 is a schematic diagram of the outline of the authentication system according to the fifth embodiment. A terminal A illustrated in FIG. 13 corresponds to the "request sender terminal" of the above-described embodiments. Each of terminals B1 to B3 corresponds to the "request receiver terminal".

Acknowledgers B1 to B3 are users of the terminals B1 to B3, respectively. The acknowledgers B1 to B3 verbally notify a traveling employee A, who is the user of the terminal A, of "IP-B1", "IP-B2", and "IP-B3", respectively.

The traveling employee A, who is the user of the terminal A, inputs "IP-B1", "IP-B2", and "IP-B3" in the fields of destinations of the dedicate frame. Upon receiving the setting input from the user, the terminal A sends the authentication request to each of the terminals B1 to B3.

Each of the acknowledgers B1 to B3, who are the users of the terminals B1 to B3, checks contents of the authentication request appearing on the display device and inputs an authentication result to the corresponding terminal. Upon receiving the input of the authentication result, each of the terminals B1 to B3 sends the authentication result to the terminal A. Even if, for example, the acknowledgers B1 and B2 are absent and only the acknowledger B3 is present, the traveling employee A can quickly receive the authentication result from the acknowledger B3.

The other processes performed by the terminal A and the terminals B1 to B3 are basically the same as those performed by the request sender terminal 10 and the request receiver terminal 30 in the above-described embodiments.

As mentioned above, in the fifth embodiment, if a system includes a plurality of terminals (e.g., the terminals B1 to B3) that determine whether the user of a terminal (e.g., terminal A) is authentic and can therefore access the network device 20 (switching hub or DHCP server), the authentication request is sent to each of the terminals B1 to B3. Therefore, any of the terminals B1 to B3 can perform the authentication, which reduces a response time that it takes until sending of the authentication result.

In the above-described example of the fifth embodiment, the case where the traveling employee A, who is the user of the terminal A, inputs "IP-B1", "IP-B2", and "IP-B3" in the fields of destinations of the dedicated frame and the terminal A then sends the authentication request to each of the terminals B1 to B3 using the dedicated frame. However, some other manners can be taken in the present invention. It is allowable to use a dedicated frame including a single multicast address so as to send the authentication request to a plurality of destinations (e.g., the terminals B1 to B3).

[f] Sixth Embodiment

If the system according to the above-described fifth embodiment further includes a plurality of request sender terminals 10, which are used to access the network device 20, in addition to a plurality of request receiver terminals 30, which determine whether the user of the request sender terminal 10 is authentic and can therefore access the network device 20, and if the number of received authentication requests has increased to an upper limit and therefore the request receiver terminal 30 cannot receive a new authentication request, it is allowable to forward the new authentication request to another request receiver terminal 30. The outline of an authentication system according to a sixth embodiment is described below with reference to FIG. 15. Each of terminals A1 to A3 illustrated in FIG. 15 corresponds to the "request sender terminal" of the above-described embodiments. Each of the terminals B1 to B3 corresponds to the "request receiver terminal", as is described in the fifth embodiment.

Figure 15:
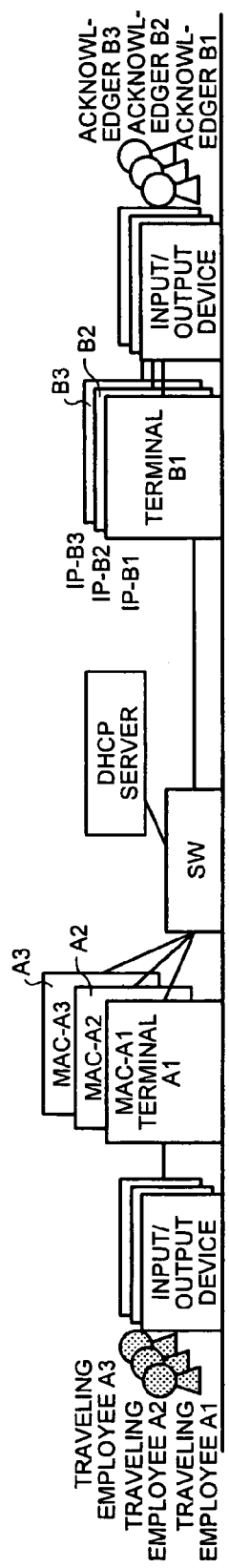
FIG. 15 is a schematic diagram of the outline of an authentication system according to a sixth embodiment of the present invention.

As illustrated in FIG. 15, each of the terminals A1 to A3 sends the authentication request to each of the terminals B1 to B3, in the same manner as in the fifth embodiment. Upon receiving the authentication request (new authentication request), the terminal B1, for example, determines whether the number of received authentication requests has increased to a predetermined upper limit. If it is determined that the number of received authentication requests has increased to the upper limit, the terminal B1 forwards the new authentication request to another terminal (e.g., the terminal B2 or the terminal B3).

The processes performed by the terminals A1 to A3 and the terminals B1 to B3 are the same as those performed by the request sender terminal 10 and the request receiver terminal 30 described in the above embodiments.

As mentioned above, in the system that includes a plurality of terminals (e.g., the terminals A1 to A3) that are used to access the network device 20 (a switching hub or a DHCP server) and a plurality of terminals (e.g., the terminals B1 to B3) that determine whether the user of the terminal is authentic and can therefore access the network device, if the terminals A1 to A3 send an authentication request to each of the terminals B1 to B3 and the terminal B1, for example, receives the authentication request, the terminal B1 determines whether the number of received authentication requests has increased to the predetermined upper limit. If it is determined that the number of received authentication requests has increased to the upper limit, the terminal B1 forwards the new authentication request to another terminal (e.g., the terminal B2 or the terminal B3). Therefore, the processing load will be distributed among the terminals B1 to B3.

The upper limit can be an administrator setting value or a fixed and program hard-coded value. Suppose there is a case where the terminal B2 further forwards the received authentication request to the terminal B3 because of the number of received authentication requests being the upper limit, and the terminal B3 determines that the number of received authentication requests at the terminal B3 being the upper limit. In this case, the terminal B3 determines that there is no terminal that can receive the authentication request. The terminal B3 discards the authentication request or returns a notification indicating that all the request receiver terminals are in busy, and the process control goes to end.

[g] Seventh Embodiment

In the above embodiments, the request sender terminal 10 can be configured to check whether the authentication result has been received at fixed time intervals and send, if no authentication result has been received, the authentication request again by using the authentication-request sending unit.

For example, as soon as the authentication-request sending unit 10b sends the authentication request, the authentication-response receiving unit 10c of the request sender terminal 10 starts a timer. The authentication-response receiving unit 10c checks whether the authentication result has been received at fixed time intervals and instructs, if no authentication result has been received, the authentication-request sending unit 10b to send the authentication request again. It is allowable to set an upper limit of the number of checks whether the authentication result has been received.

As mentioned above, the request sender terminal 10 according to the seventh embodiment checks whether the authentication result has been received at fixed time intervals and sends, if no authentication result has been received, the authentication request again. Therefore, the request sender terminal 10 can deal with a case where the authentication request is deleted from the network.

[h] Eighth Embodiment

Figure 16:
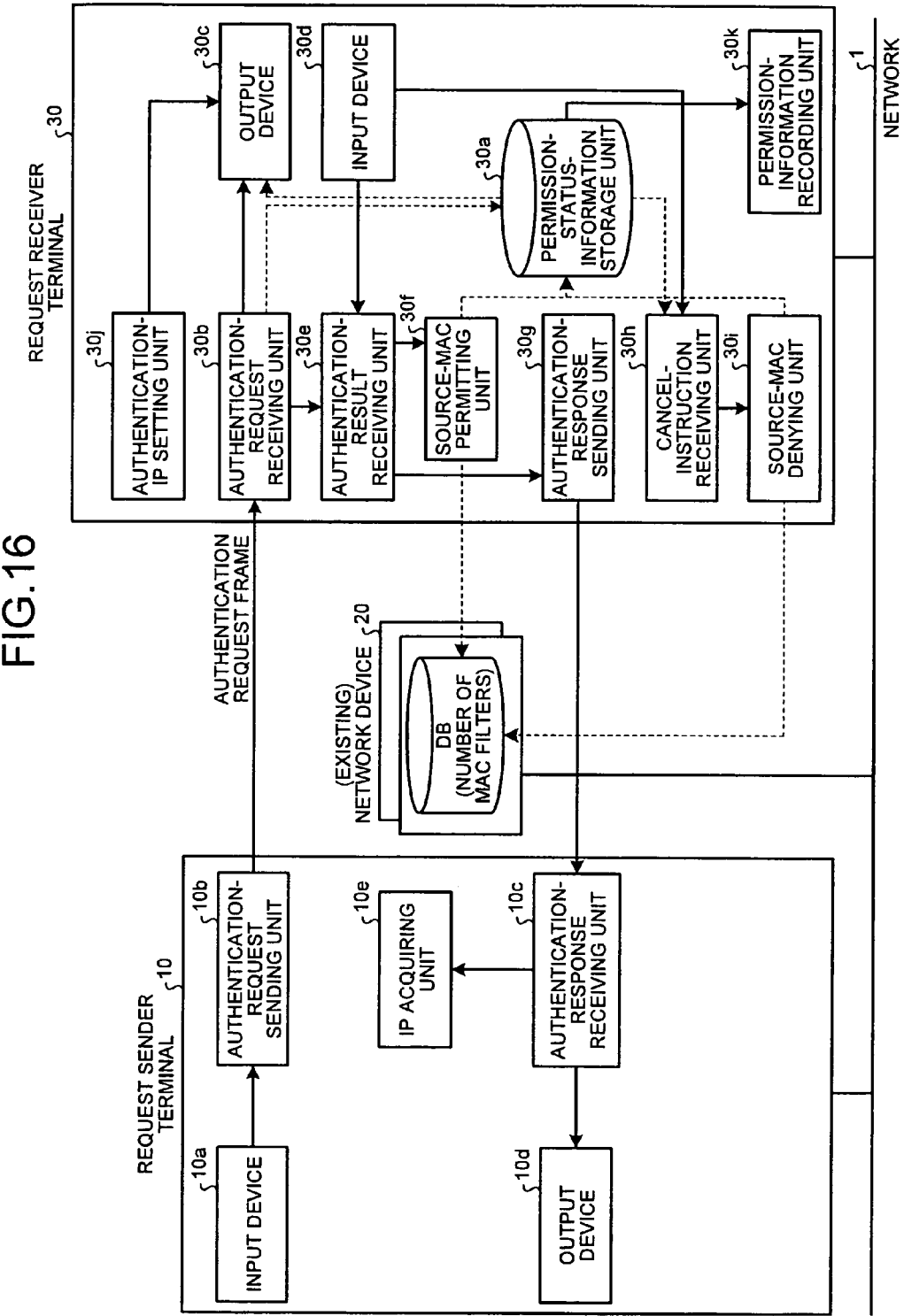
FIG. 16 is a block diagram of the configuration of an authentication system according to an eighth embodiment of the present invention.

In the above embodiments, it is allowable to record a log each time of registering or updating the permission status stored in the permission-status-information storage unit 30a. The configuration of an authentication system according to an eighth embodiment of the present invention is described below with reference to FIG. 16. FIG. 16 is a block diagram of the configuration of the authentication system according to the eighth embodiment.

As illustrated in FIG. 16, the authentication system according to the eighth embodiment has basically the same configuration as the authentication system according to the above-described embodiments except that the request receiver terminal 30 further includes a permission-information recording unit 30k.

The permission-information recording unit 30k monitors whether new information is registered in the permission-status-information storage unit 30a or the permission state stored in the permission-status-information storage unit 30a is updated. The permission-information recording unit 30k records a log of information stored in the request receiver terminal 30 each time of registering or updating of the permission status (each time, for example, the authentication-request receiving unit 30b registers the permission status or the source-MAC permitting unit 30f and the source-MAC denying unit 30i updates the permission status).

As mentioned above, the request receiver terminal 30 according to the eighth embodiment records a log of registering or updating of the permission status each time of registering or updating of information about the permission status. Therefore, the user of the request receiver terminal 30 can check the history concerning access permission for the request sender terminal 10 if required.

The log of information about the permission status can be stored in not only the own terminal but also another device. In the latter case, information about the permission status is, for example, sent to the device by an existing network control tool or an application programming interface (API) having a log tool.

[i] Ninth Embodiment

Figure 17:
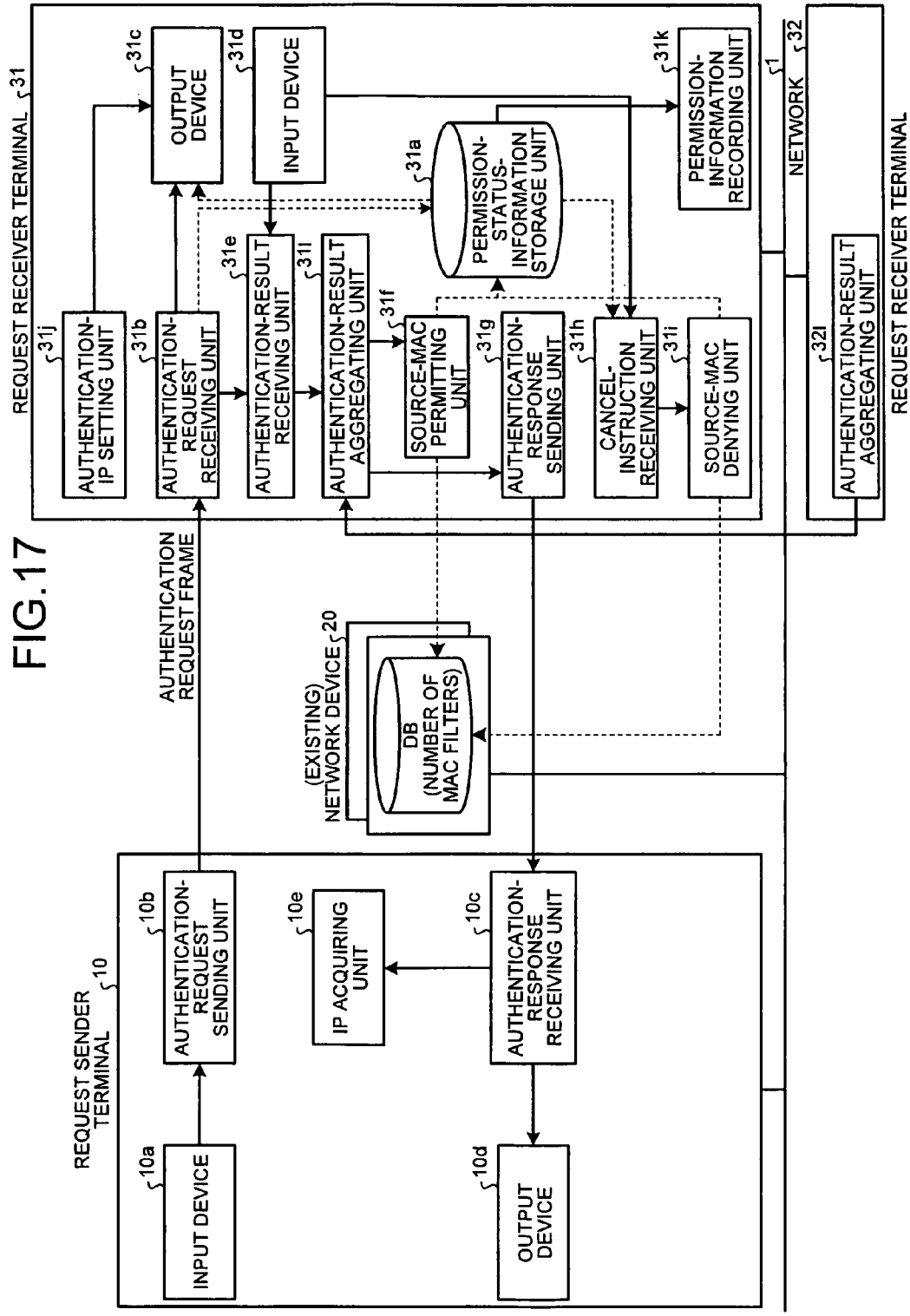
FIG. 17 is a block diagram of the configuration of an authentication system according to a ninth embodiment of the present invention.

If the system includes a plurality of request receiver terminals 30 that determine whether the user of the request sender terminal 10 is authentic and can therefore access the network device 20 as in the cases described in the fifth embodiment or the sixth embodiment, it is allowable to aggregate the authentication result from each of the request receiver terminals 30. The configuration of an authentication system according to a ninth embodiment of the present invention is described below with reference to FIG. 17. FIG. 17 is a block diagram of the configuration of the authentication system according to the ninth embodiment.

As illustrated in FIG. 17, the authentication system according to the ninth embodiment has basically the same configuration as the authentication system according to the above-described embodiments except for further including request receiver terminals 31 and 32 and an authentication-result aggregating units 311 and 321.

Upon receiving the authentication request from the request sender terminal 10, each of the request receiver terminals 31 and 32 determines that the first destination terminal that is stored in the first one of the fields of destinations of the received frame (see FIG. 9) to be a terminal that aggregates the authentication results (hereinafter, "aggregating terminal"). The aggregating terminal is not limited to the destination terminal stored in the first field. Any one of destination terminals can be determined to be the aggregating terminal.

If the aggregating terminal is, for example, the request receiver terminal 31, the authentication-result aggregating unit 321 of the request receiver terminal 32 notifies the authentication-result aggregating unit 311 of the request receiver terminal 31 of the authentication result received from the user. The authentication-result aggregating unit 311 of the request receiver terminal 31 aggregates the authentication results received from the request receiver terminal 31 and the request receiver terminal 32. If the both authentication results are permission to access the network device 20, the authentication-result aggregating unit 311 instructs a source-MAC permitting unit 31*f* to register the MAC address of the request sender terminal 10, which is the sender of the authentication request, in the network device 20 as an access permitted terminal and instructs an authentication-response sending unit 31*g* to send the authentication result to the request sender terminal 10.

The determination whether the request sender terminal 10 is permissible to access the network device 20 can be made by some references other than whether all the authentication results of the request receiver terminals are access permission. For example, a percentage of the number of the authentication results indicative of access permission for the request sender terminal (relative value) or whether the number of authentication results indicative of access permission is larger than a threshold (absolute value) can be used to determine whether access by the request sender terminal 10 is permissible.

As mentioned above, upon receiving the authentication request having a plurality of destinations representing request receiver terminals, the request receiver terminal according to the ninth embodiment (e.g., the request receiver terminal 31 or 32) aggregates the authentication results received from all the request receiver terminals including the own terminal and registers, if it is determined using a result of the aggregation that access to the network device 20 is permissible, information about the address of the terminal device, which is the sender of the authentication request, in the network device 20 as an access permitted terminal. This improves the security level compared with the case where a single request receiver terminal performs the authentication. If there are two or more request receiver terminals, for example, it can be configured to register information about the address of the terminal device, which is the sender of the authentication request, in the network device 20 as an access permitted terminal only when two of the request receiver terminals or more determine that access by the request sender terminal is permissible.

[j] Tenth Embodiment

Figure 18:
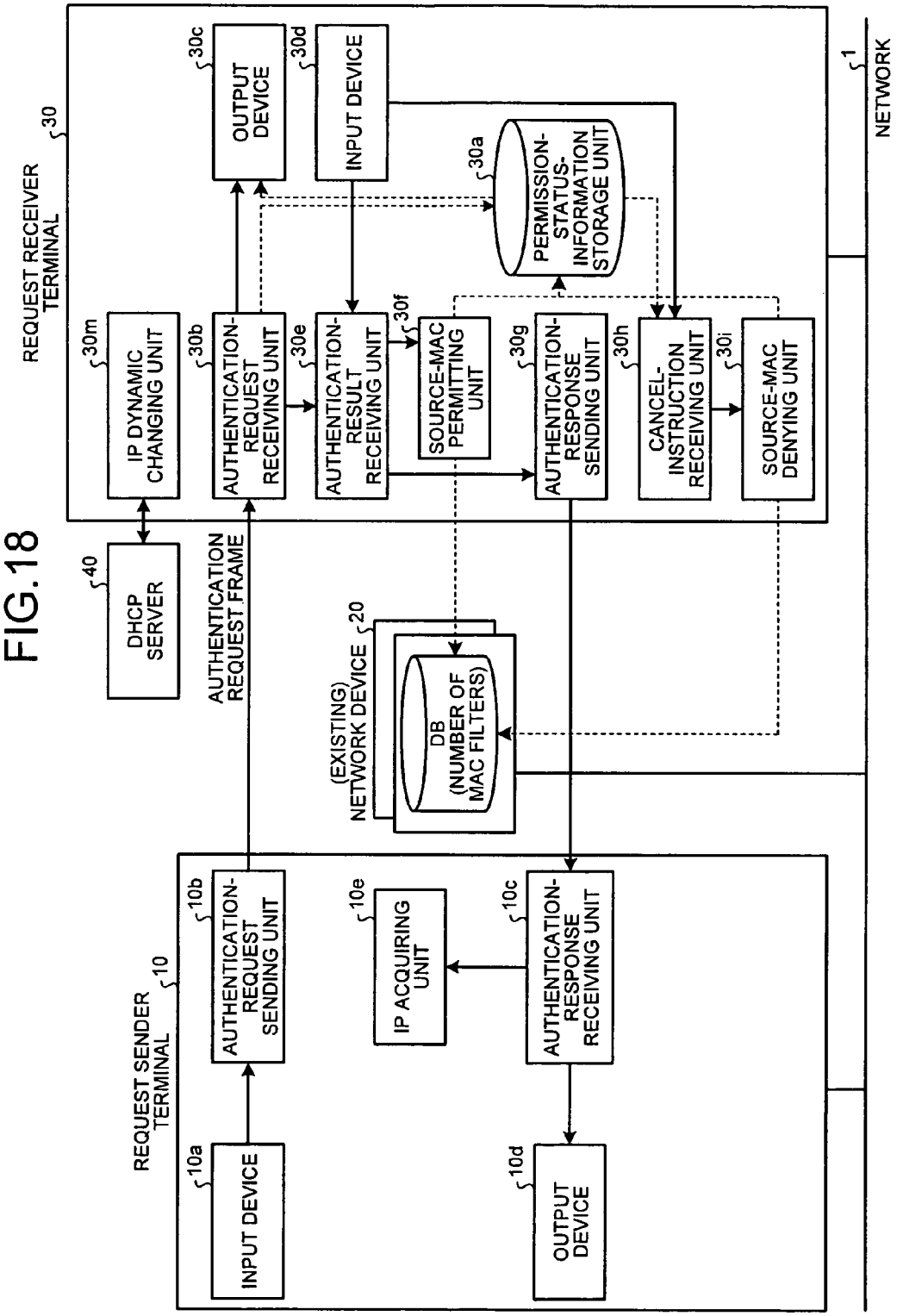
FIG. 18 is a block diagram of the configuration of an authentication system according to a tenth embodiment of the present invention.
Figure 19:
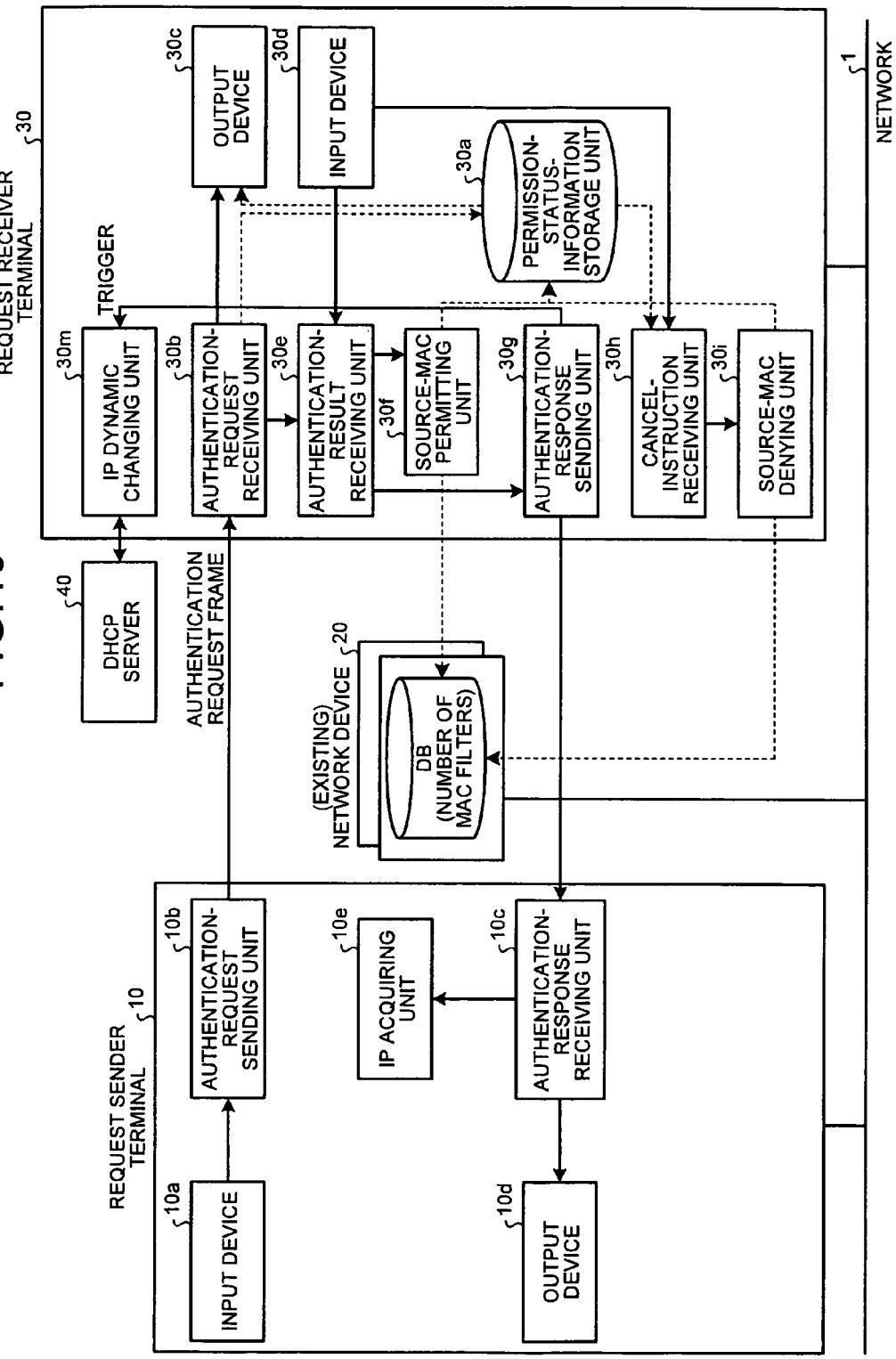
FIG. 19 is a block diagram of the configuration of the authentication system according to the tenth embodiment.

In the above embodiments, the IP address, which is used as the authentication information of the request sender terminal 10, can be changed dramatically depending on various triggers. The outline of an authentication system according to a tenth embodiment of the present invention is described below with reference to FIGS. 18 and 19. FIGS. 18 and 19 are block diagrams of the configuration of the authentication system according to the tenth embodiment.

As illustrated in FIGS. 18 and 19, the authentication system according to the tenth embodiment has basically the same configuration as the authentication system according to the above-described embodiments except that the request receiver terminal 30 further includes an IP dynamic changing unit 30*m*.

The IP dynamic changing unit 30*m* changes the IP address, which is used as the authentication information, at, for example, terminal setup as a trigger. As illustrated in FIG. 18, upon detecting setup of the request receiver terminal 30, the IP dynamic changing unit 30*m* requests the DHCP server 40 for an IP address and then receives the IP address from the DHCP server 40. If the received IP address is the same as the previous IP address, the IP dynamic changing unit 30*m* releases the received IP address, requests the DHCP server 40 for a new IP address different from the received IP address, and receives the new address from the DHCP server 40.

The IP dynamic changing unit 30*m* can be configured to change the IP address that is used as the authentication information at the completion of the registration of permission for the request sender terminal 10 to access the network device 20 as a trigger. In other words, as illustrated in FIG. 19, when the IP dynamic changing unit 30*m* detects that the authentication result has been sent by the authentication-response sending unit 30*g* after the completion of the registration of permission for the request sender terminal 10 to access the network device 20, the IP dynamic changing unit 30*m* releases the current IP address, requests the DHCP server 40 for a new IP address, and then receives the new IP address from the DHCP server 40. If the received IP address is the same as the previous IP address, the IP dynamic changing unit 30*m* releases the received IP address, requests the DHCP server 40 for a new IP address different from the received IP address, and receives the new address from the DHCP server 40 in the same manner as described above.

Once an IP is sent to a given terminal, a typical DHCP server stores therein the MAC of the given terminal and the sent IP as a pair and sends, if receiving an IP acquisition request with the same MAC address within a predetermined period, the same IP to the given terminal. To acquire an IP address different from that acquired at the previous startup, the request receiver terminal, for example, activates itself using an MAC address different from that used at the previous setup or explicitly requests for a different IP using a DHCP Offer message.

As mentioned above, when the authentication information is acquired again at the startup or the completion of the authentication and it is determined that the acquired authentication information is the same as that used in the previous time, the request receiver terminal according to the tenth embodiment acquires different authentication information. Therefore, the same authentication information cannot be used repeatedly, which improves the security level.

The authentication information can be changed without requesting the DHCP server 40 for an IP address. Some other manners can be used in the present invention, such as a manner of acquiring an IP using a PPP over Ethernet (PPoE) or a manner of storing some IP addresses in the request receiver terminal 30, selecting by the request receiver terminal 30 an appropriate IP address different from the IP address that is used at the previous time, and using the selected IP address as the authentication information.

[k] Eleventh Embodiment

Figure 20:
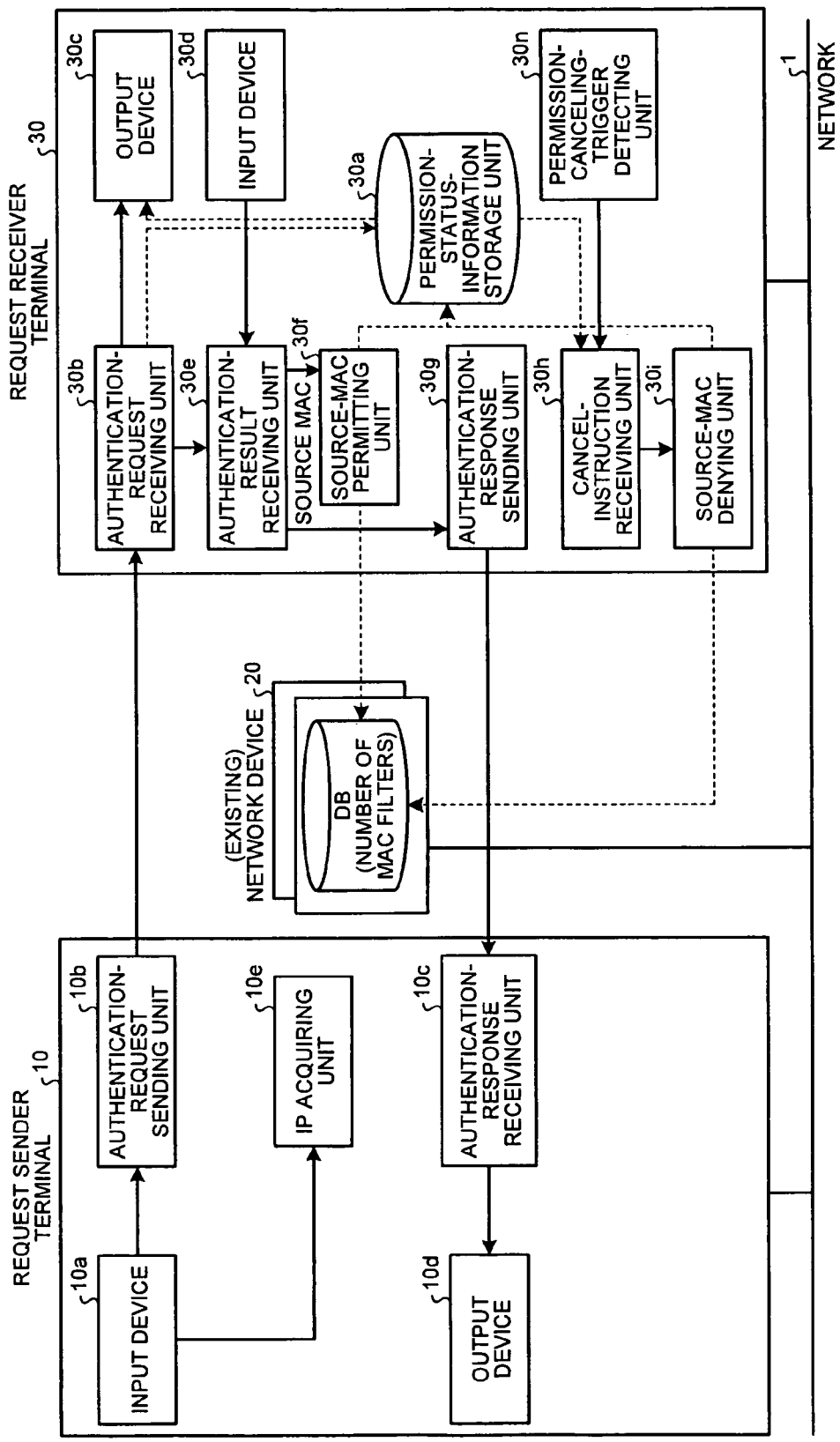
FIG. 20 is a block diagram of the configuration of an authentication system according to an eleventh embodiment of the present invention.

In the above embodiments, the permission for the request sender terminal 10 to access the network device 20 can be cancelled in response to various triggers. An authentication system according to an eleventh embodiment of the present invention is described below with reference to FIG. 20. FIG. 20 is a block diagram of the configuration of the authentication system according to the eleventh embodiment.

As illustrated in FIG. 20, the authentication system according to the eleventh embodiment has basically the same configuration as the authentication system according to the above-described embodiments except that the request receiver terminal 30 further includes a permission-canceling-trigger detecting unit 30*n*.

The permission-canceling-trigger detecting unit 30*n* detects terminal shutdown, shift to a suspend status, and change in the usage status, such as terminal logoff, as a trigger for deregistration. The permission-canceling-trigger detecting unit 30*n* starts a built-in timer when the registration of the request sender terminal 10 in the network device 20 as an access permitted terminal is completed and then detects that the trigger for deregistration is set on a predetermined period after the completion of the registration. Moreover, the permission-canceling-trigger detecting unit 30*n* detects change in the application usage status as the trigger for deregistration, such as end or logoff of an application that is used for a conference by both the request sender terminal 10 and the request receiver terminal 30. When the permission-canceling-trigger detecting unit 30*n* detects the above-described triggers for deregistration, the permission-canceling-trigger detecting unit 30*n* instructs the cancel-instruction receiving unit 30*h* to delete the information about the address of the request sender terminal 10 from a list of access permitted terminals stored in the network device 20.

As mentioned above, the request receiver terminal 30 in the eleventh embodiment detects change in the usage status and deletes, if change in the usage status has been detected, the information about the address of the request sender terminal 10 from a list of access permitted terminals stored in the network device 20. The access permission for the request sender terminal 10 can be cancelled in response to, for example, change in the usage status such as shut-down, shift to the suspend status, and logoff of the request receiver terminal 30, as a trigger. With this configuration, the authentication system can deal with a case where the user is away from the request receiver terminal 30, which improves the security level.

Moreover, in the eleventh embodiment, the information about the address of the request sender terminal 10 is deleted from a list of access permitted terminals stored in the network device 20 a predetermined period after the registration of the information of the address of the terminal device. This avoids a risk that the user of the request receiver terminal 30 forgets performing the canceling process and therefore improves the security level.

Furthermore, in the eleventh embodiment, when change in the application usage status of the request receiver terminal 30 is detected, the information about the address of the request sender terminal 10 is deleted from a list of access permitted terminals stored in the network device 20. The access permission for the request sender terminal 10 is cancelled in response to, for example, end of an application that is used for a conference by both the request sender terminal 10 and the request receiver terminal 30 as a trigger. This avoids a risk of illegal access to the network device 20 after the original purpose has been achieved and therefore improves the security level.

[l] Twelfth Embodiment

The present invention can be implemented by other embodiments in addition to the above-described various embodiments. In the following section, other embodiments included in the present invention will be described.

(1) Device Configuration, Etc.

The constituent elements of the request receiver terminal 30 illustrated in FIG. 3 are merely conceptual, and need not be physically configured as illustrated. The constituent elements, as a whole or in part, can be separated or integrated either functionally or physically based on various types of loads or use conditions. For example, it is allowable to arrange the output device 30*c* and the input device 30*d* on different terminals. The process functions performed by the request receiver terminal 30 are entirely or partially realized by a CPU or computer programs that are analyzed and executed by the CPU, or realized as hardware by wired logic.

(2) Authentication Processing Program

Figure 21:
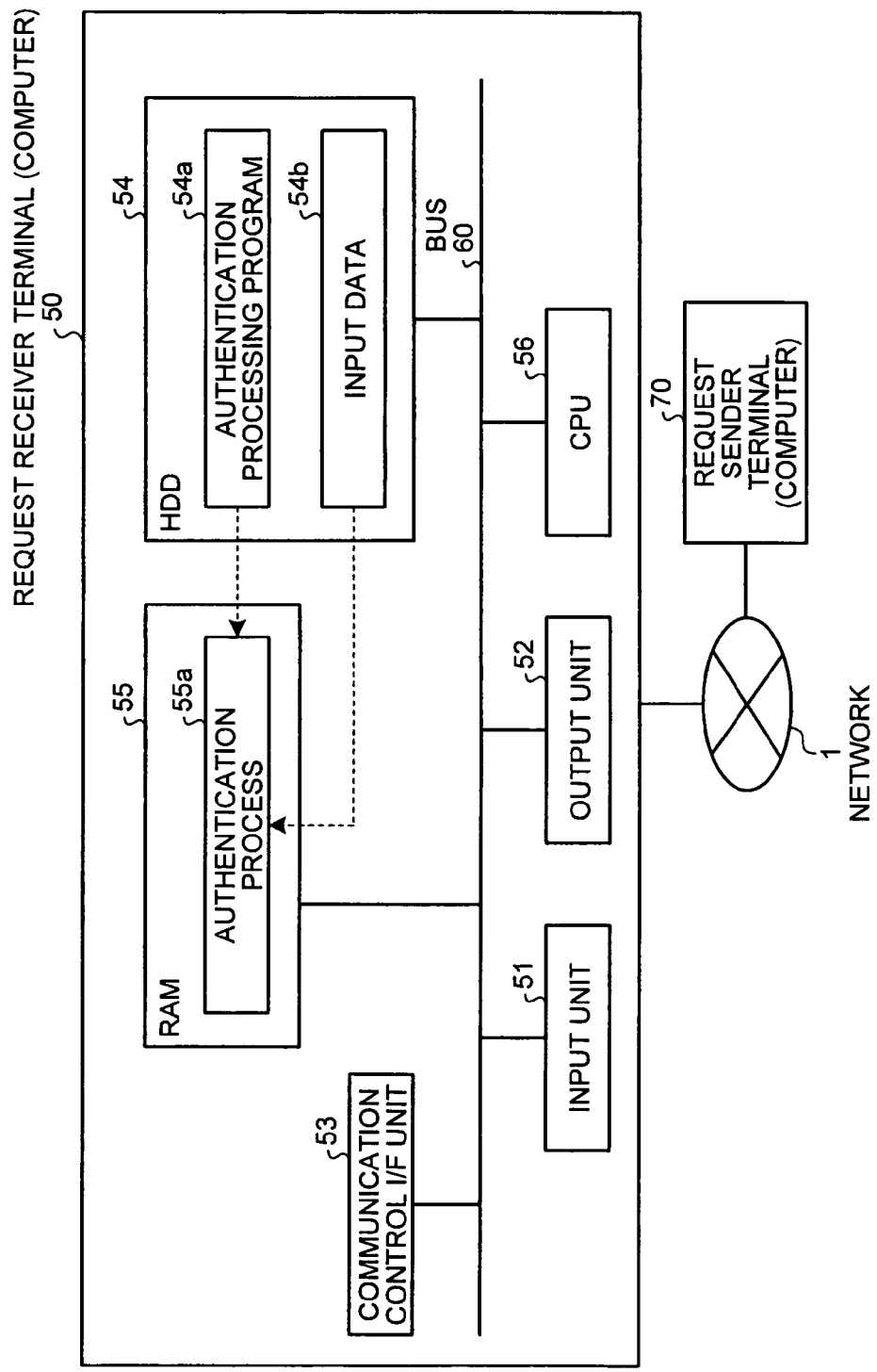
FIG. 21 is a block diagram of a computer that executes an authentication processing program.
Figure 22:
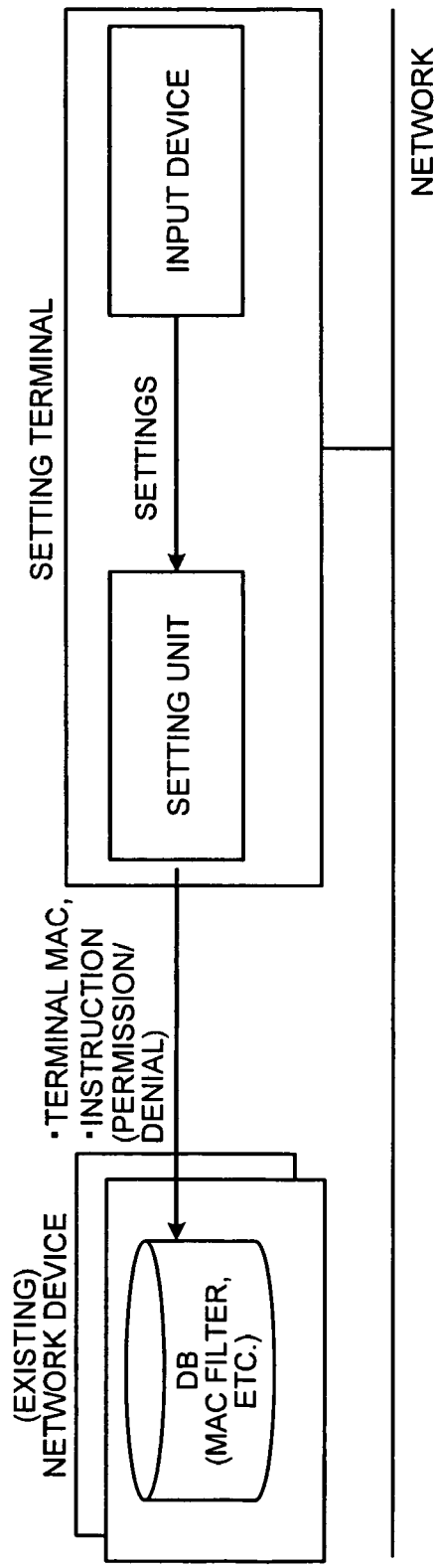
FIG. 22 is a block diagram illustrating a conventional technology.

The various processes performed by the request receiver terminal 30 that is described in the above embodiments (see, for example, FIGS. 5 to 8 and etc.) can be implemented by executing predetermined computer programs using a computer system, such as a personal computer and a workstation. In the following section, an example of a computer that executes an authentication processing program so as to implement the same functions as those described in the above embodiments is described with reference to FIG. 21. FIG. 21 is a block diagram of the computer that executes the authentication processing program.

As illustrated in FIG. 21, a computer 50 that works as the request receiver terminal includes an input unit 51, an output unit 52, a communication control I/F unit 53, an HDD 54, a RAM 55, and a CPU 56, those connected to each other via a bus 60.

The input unit 51 receives an input of various data from the user. The output unit 52 displays various information thereon. The communication control I/F unit 53 controls communications with a request sender terminal 70 concerning various data via the network 1. The RAM 55 temporarily stores therein various information. The HDD 54 stores therein information required for the CPU 56 to execute various processes. The CPU 56 performs various computing processes.

The HDD 54, as illustrated in FIG. 21, prestores therein an authentication processing program 54*a*, which implements functions the same as those of the processing units of the request receiver terminal described in the above embodiments, and input data 54*b* received from the user via the input unit 51. A part of the authentication processing program 54*a* can be stored in a storage unit of another computer that is connected to the computer 50 via a network if required.

When the CPU 56 reads the authentication processing program 54*a* from the HDD 54 and then loads the authentication processing program 54*a* on the RAM 55, the authentication processing program 54*a* works as an authentication process 55*a* as illustrated in FIG. 21. The authentication process 55*a* reads the input data 54*b*, etc., from the HDD 54, loads the obtained data on an area of the RAM 55 allocated thereto, and executes various processes using the loaded data, etc. The authentication process 55*a* corresponds to the authentication-request receiving unit 30*b*, the authentication-result receiving unit 30*e*, the source-MAC permitting unit 30*f*, the authentication-response sending unit 30*g*, the cancel-instruction receiving unit 30h, and the source-MAC denying unit 30i of the request receiver terminal 30 illustrated in FIG. 3.

It is not necessary to prestore the above-described authentication processing program 54a in the HDD 54. The computer programs can be stored in, for example, a "portable physical medium" that is inserted to the computer 50, such as a flexible disk (FD), a CD-ROM, a DVD, a magneto-optical disk, and an IC card, or "another computer (or server)" that is connected to the computer 50 via the public line, the Internet, a LAN, a WAN, or the like. The computer 50 reads the computer programs from the recording medium and executes the obtained computer programs.

According to an embodiment, easy authentication within a network is implemented and the network device settings required when permission to access the network device is given are performed automatically.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An authentication system including a terminal device that is used to access a network device and a terminal authentication device that determines whether a user of the terminal device is authentic and can therefore access the network device, the terminal device and the terminal authentication device being connected to each other via a network, the authentication system comprising:

the terminal device comprising:
   a first input unit by which an IP address of the terminal authentication device is input wherein the first input unit is a manual input unit;
   an authentication-request sending unit that sends an authentication request concerning whether access to the network device is permissible to the terminal authentication device using an authentication-request frame including a gratuitous ARP request in which the input IP address of the terminal authentication device is set as a sender IP address;
   an authentication-result receiving unit that receives a response frame from the terminal authentication device as an authentication result, the response frame responding to the authentication-request frame;
   an authentication-result output/display unit that outputs/displays a message indicating that the response frame is received when the response frame is received; and
   a network-access-information acquiring unit that acquires, from the network device, an IP address to access the network device, in response to an instruction to acquire the IP address from the first input unit, the terminal authentication device comprising:
   an authentication-request receiving unit that receives the authentication-request frame from the terminal device;
   an authentication-request output/display unit that outputs/displays a message indicating that the authentication-request frame is received when the authentication-request frame is received;
   a second input unit by which an authentication result indicating whether access to the network device is permissible is input;
   an information registering unit that registers, in the network device, when the input authentication result indicates permission to access the network device, a MAC address of the terminal device which is the sender of the authentication request as an access permitted terminal; and
   an authentication-result sending unit that sends the input authentication result to the terminal device which is the sender of the authentication request, after registering the MAC address in the network device is completed.

2. The authentication system according to claim 1, the terminal authentication device further comprising:
   an access-permission-status storage unit that stores therein, when the authentication request is received by the authentication-request receiving unit, both the information about the address of the terminal device, which is the sender of the authentication request, and information about an access permission status indicative of a status whether the terminal device is permitted to access the network device in an associated manner.

3. The authentication system according to claim 2, the terminal authentication device further comprising:
   an access-permission canceling unit that deletes, when a cancel instruction is received to cancel permission for the terminal device to access the network device, the information about the address of the terminal device that is specified by the cancel instruction from a list of information about addresses of access permitted terminals that is stored in the network device, and
   when the terminal device is deregistered by the access-permission canceling unit, the access-permission-status storage unit stores therein information that the permission for the terminal device to access the network device is cancelled.

4. The authentication system according to claim 1, wherein an existing frame that has already been implemented by the terminal device and the terminal authentication device is used to send/receive the authentication request and the authentication result to/from the terminal device and the terminal authentication device.

5. The authentication system according to claim 1, wherein a frame dedicated to authentication is used to send/receive the authentication request and the authentication result to/from the terminal device and the terminal authentication device.

6. The authentication system according to claim 1, wherein the terminal authentication device includes an authentication-information acquiring unit that acquires an IP address used for authentication but not the IP address used for communications in a normal situation.

7. The authentication system according to claim 5, wherein the authentication-request sending unit sends the authentication request using a frame including both the authentication information and a user identifier that is used to identify the user of the terminal device.

8. The authentication system according to claim 5, wherein,
   the terminal authentication device includes a plurality of terminal authentication devices that determines whether the user of the terminal device is authentic and can therefore access the network device, and
   the authentication-request sending unit sends the authentication request to each of the terminal authentication devices.

9. The authentication system according to claim 8, wherein the terminal device includes a plurality of terminal devices that is used to access the network device and the terminal authentication device includes a plurality of terminal authentication devices that determines whether the user of the terminal device is authentic and can therefore access the network device,
- the terminal authentication device further includes an authentication-request forwarding unit that determines, when a new authentication request having two or more terminal authentication devices as destinations is received by the authentication-request receiving unit, whether number of received authentication requests has increased to a predetermined value and forwards, when the number of received authentication requests has increased to the predetermined value, forwarding the new authentication request to another terminal authentication device.

10. The authentication system according to claim 1, wherein the terminal device checks at fixed time intervals whether the authentication result is received by the authentication-result receiving unit and re-sends the authentication request to the terminal authentication device using the authentication-request sending unit each time it is confirmed that no authentication result is received.

11. The authentication system according to claim 2, the terminal authentication further comprising:
- an access-permission-status information recording unit that records, each time new information is registered in the access-permission-status storage unit or the information about the access permission status stored in the access-permission-status storage unit is updated, the new information and the updated information.

12. The authentication system according to claim 8, wherein
- the terminal authentication device includes an authentication-result aggregating unit that aggregates, when the authentication request having two or more terminal authentication devices as destinations is received by the authentication-request receiving unit, all the authentication results received by the terminal authentication devices including the authentication result received by own terminal authentication device, and
- when a result that is obtained by aggregating all the authentication results received by the terminal authentication devices using the authentication-result aggregating unit indicates permission to access the network device, the information registering unit registers the information about the address of the terminal device, which is the sender of the authentication request, in the network device as an access permitted terminal.

13. The authentication system according to claim 6, wherein when the authentication-information acquiring unit acquires the authentication information again at time of startup and the acquired authentication information is the same as the authentication information that has been acquired at time of a previous startup, the authentication-information acquiring unit acquires new authentication information different from the acquired authentication information.

14. The authentication system according to claim 13, wherein when the authentication-information acquiring unit acquires the authentication information again after the registering by the information registering unit in the network device is completed and the acquired authentication information is the same as the authentication information that has been used for previous authentication, the authentication-information acquiring unit acquires new authentication information different from the acquired authentication information.

15. The authentication system according to claim 3, the terminal authentication device further comprising:
- a usage-status-switching detecting unit that detects switching of usage status of the terminal authentication device, and
- when switching of the usage status of the terminal authentication device is detected by the usage-status-switching detecting unit, the access-permission canceling unit deletes the information about the address of the terminal device from the list of information about addresses of access permitted terminals that is stored in the network device.

16. The authentication system according to claim 15, wherein
- the usage-status-switching detecting unit detects switching of usage status of an application working in the terminal authentication device, and
- when switching of the usage status of the application is detected by the usage-status-switching detecting unit, the access-permission canceling unit deletes the information about the address of the terminal device from the list of information about addresses of access permitted terminals that is stored in the network device.

17. The authentication system according to claim 3, wherein a predetermined time after the information about the address of the terminal device is registered in the network device as the access permitted terminal, the access-permission canceling unit deletes the information about the address of the terminal device from the list of information about addresses of access permitted terminals that is stored in the network device.

* * * * *